United States Patent [19]

Morita

[11] Patent Number: 5,610,809
[45] Date of Patent: Mar. 11, 1997

[54] PROGRAMMABLE CONTROLLER AND PROGRAM CAPACITY CHANGING METHOD THEREOF

[75] Inventor: Hideaki Morita, Nagoya, Japan

[73] Assignee: Mitsubishi Denki Kabushiki Kaisha, Tokyo, Japan

[21] Appl. No.: 365,191

[22] Filed: Dec. 28, 1994

[30]  Foreign Application Priority Data

Jan. 11, 1994 [JP] Japan .................................. 6-001203

[51] Int. Cl.⁶ .................................................. G06F 19/00
[52] U.S. Cl. ........................................... 364/140; 364/146
[58] Field of Search ................................... 364/140, 141, 364/146, 147, DIG. 1 MS File, DIG. 2 MS File; 395/497.01–497.04, 600, 821

[56]  References Cited

U.S. PATENT DOCUMENTS

| | | | |
|---|---|---|---|
| 4,281,392 | 7/1981 | Grants et al. | 364/DIG. 2 |
| 4,484,303 | 11/1984 | Provanzano et al. | 364/147 X |
| 4,608,628 | 8/1986 | Saito | 364/146 X |
| 5,339,411 | 8/1994 | Heaton, Jr. | 395/600 |

FOREIGN PATENT DOCUMENTS

| | | |
|---|---|---|
| 0038703 | 10/1981 | European Pat. Off. . |
| 1205203 | 8/1989 | Japan . |
| 233653 | 2/1990 | Japan . |
| 293742 | 4/1990 | Japan . |
| 2140825 | 5/1990 | Japan . |
| 2259910 | 10/1990 | Japan . |
| 3222047 | 10/1991 | Japan . |
| 2251323 | 7/1992 | United Kingdom . |
| 2251324 | 7/1992 | United Kingdom . |
| 9119244 | 12/1991 | WIPO . |

OTHER PUBLICATIONS

Paul G. Caspers: "Aufbau von Betriebssystemen". Sammlung Goschen Band 7013, Walter de Gruyter, Berlin New York 1974, pp. 74–78.

Thomas Haindl: "Einfuhrung in die Datenorganisation", Physica Verlag Wurzburg Wein 1982, pp. 15, 16.

Peter Wratil: "Speicheprogrammierbare Steuerugen in der Automatisierungstechnik", Vogel Buchverlag Wurzburg 1989, pp. 85–98.

Primary Examiner—Joseph Ruggiero
Attorney, Agent, or Firm—Sughrue, Mion, Zinn, Macpeak & Seas

[57]  ABSTRACT

A programmable controller comprises a user memory in which a plurality of programs each divided to functional blocks or data are stored as files and a user memory management table in which data on storage space, attribute, and capacity of each file is stored. This structure enables newly writing a file from a peripheral device, changing a capacity of each file, and freely accessing each file maintaining continuity of file data.

11 Claims, 35 Drawing Sheets

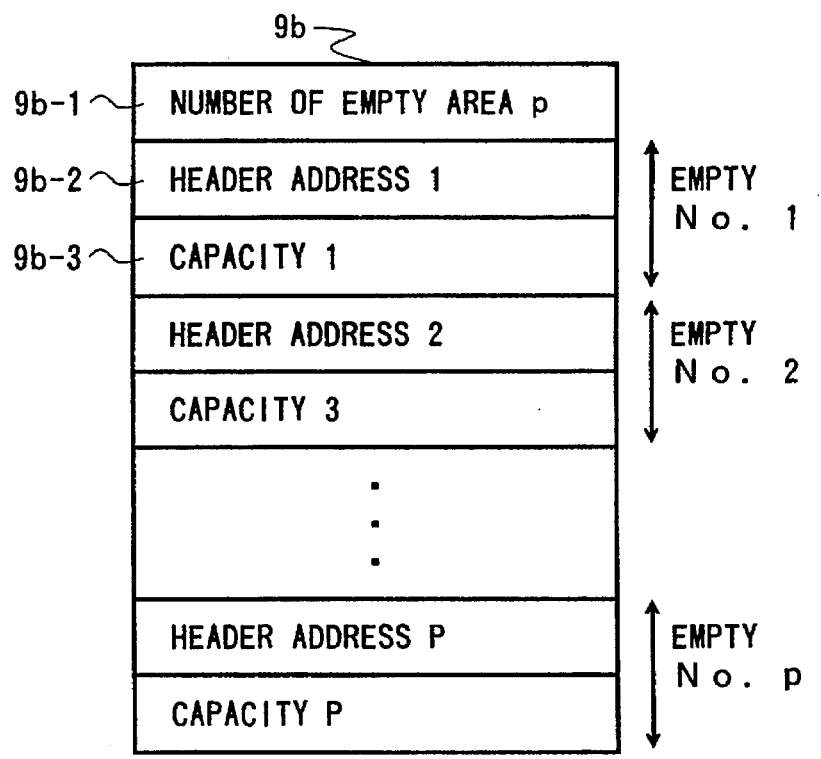

FIG. 7

| R1 | |
|---|---|
| NEW REGISTRATION | R11 |
| PROGRAM NAME | R12 |
| ATTRIBUTE | R13 |
| CAPACITY | R14 |

| A1 | |
|---|---|
| ERROR CODE | A11 |
| REGISTERED No. | A12 |

| R2 | |
|---|---|
| DATA WRITE | R21 |
| REGISTERED No. | R22 |
| OFF-SET ADDRESS | R23 |
| CAPACITY FOR WRITING | R24 |
| WRITING DATA | R25 |

| A2 | |
|---|---|
| ERROR CODE | A21 |

```
[CHANGE CAPACITY OF FILE]

1. FILE NAME          [BK2       ]
2. ATTRIBUTE          [SEQUENCE PROGRAM  ]
3. ADDITIONAL CAPACITY [100      ] STEP
```

R3

| | |
|---|---|
| CHANGE CAPACITY | R 3 1 |
| PROGRAM NAME | R 3 2 |
| ATTRIBUTE | R 3 3 |
| CHANGE CAPACITY | R 3 4 |

A3

| | |
|---|---|
| ERROR CODE | A 3 1 |

F I G. 1 4
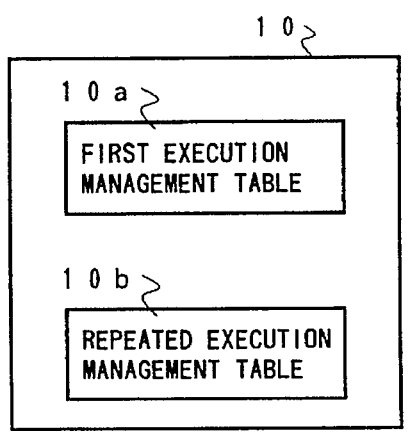
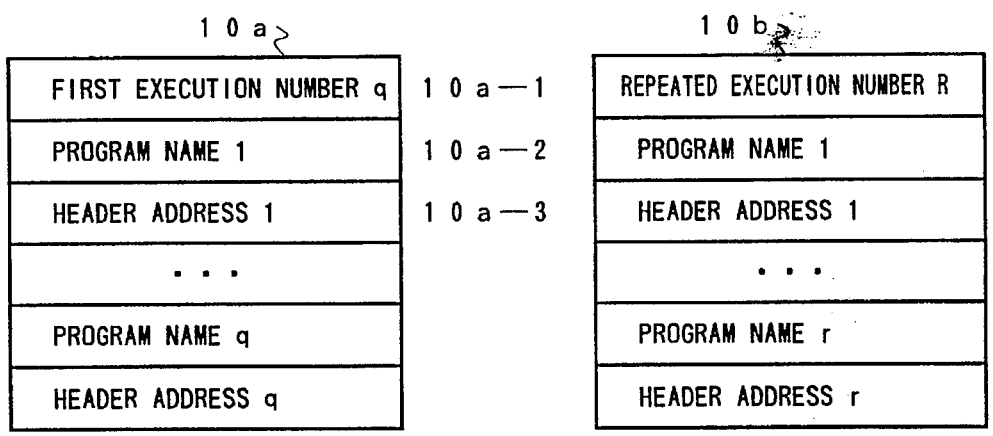

FIG. 17
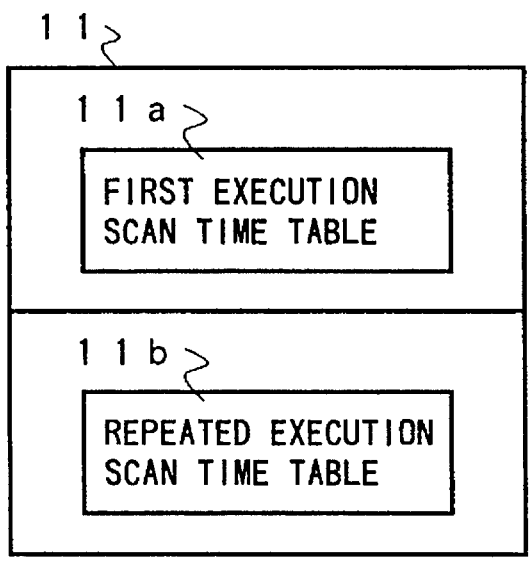
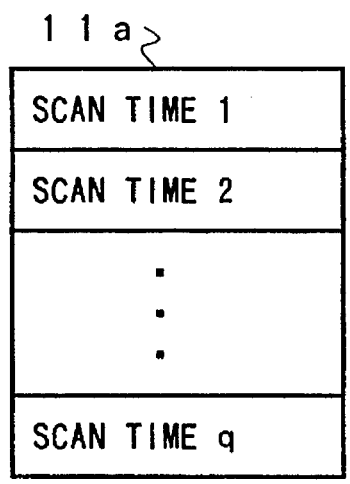
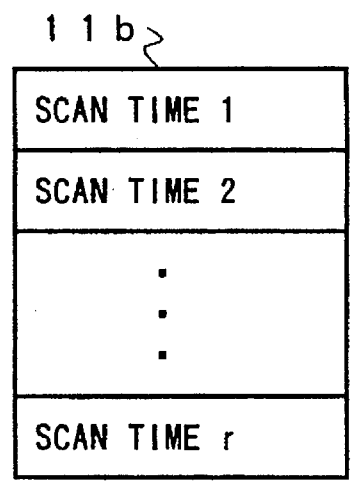

FIG. 19
```
【SETTING POINTER】
COMMON POINTER No.   [P 3 0 0] AFTER
```
FIG. 20
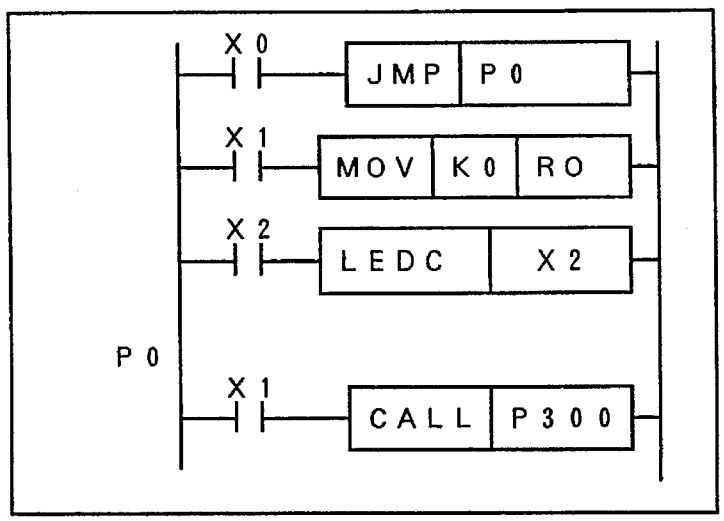
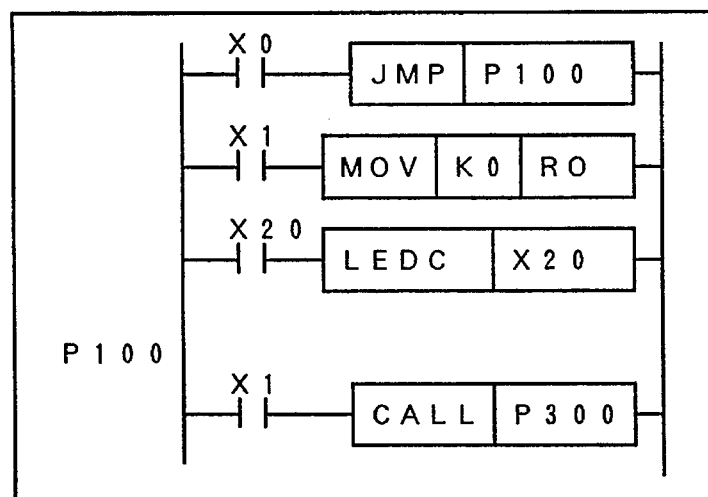
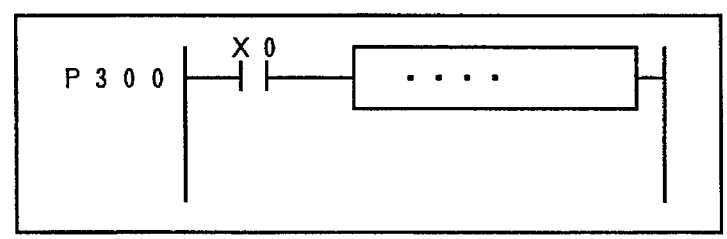

FIG. 23

FILE DATA MANAGEMENT MEMORY

| | |
|---|---|
| PRESENT FILE DATA ADDRESS | 13-1 |
| FILE DATA ADDRESS FOR PROGRAM 1 | 13a-1 |
| ... | ... |
| FILE DATA ADDRESS FOR PROGRAM q | 13a-q |
| FILE DATA ADDRESS FOR PROGRAM 1 | 13b-1 |
| ... | ... |
| FILE DATA ADDRESS FOR PROGRAM r | 13b-r |

COMMENT MANAGEMENT MEMORY

| | |
|---|---|
| PRESENT COMMENT ADDRESS | 1 4 − 1 |
| COMMENT ADDRESS FOR PROGRAM 1 | 1 4 a − 1 |
| . . . | . . . |
| COMMENT ADDRESS FOR PROGRAM q | 1 4 a − q |
| COMMENT ADDRESS FOR PROGRAM 1 | 1 4 b − 1 |
| . . . | . . . |
| COMMENT ADDRESS FOR PROGRAM r | 1 4 b − r |

1 4

FIG. 30
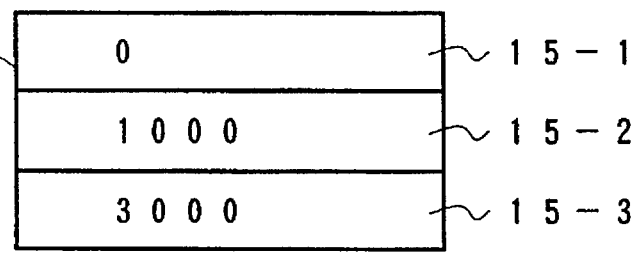
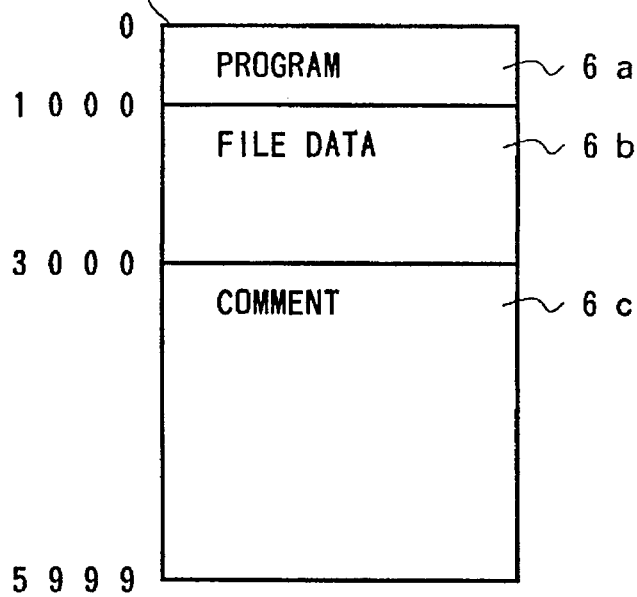

F I G. 3 1
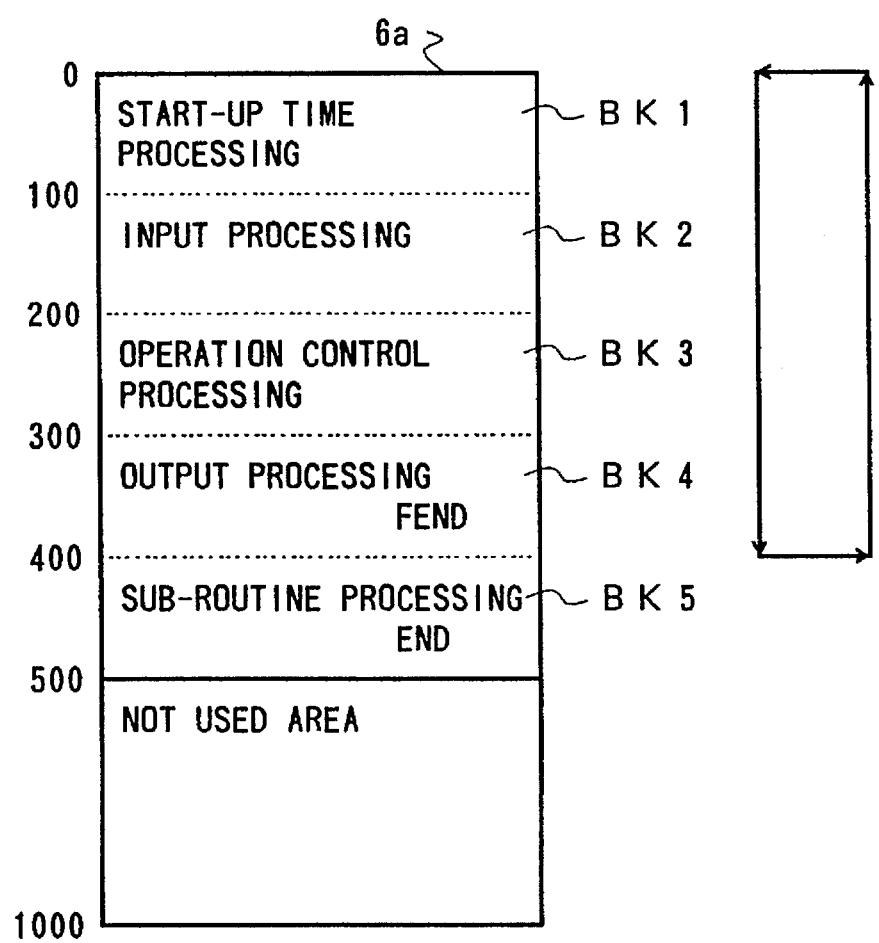

F I G. 3 2

```
[READ OUR PROGRAM]

1. [ ] WHOLE AREA
2. [*] SPECIFIED STEP    START STEP    [1 0 0] STEP
                         END STEP      [1 9 9] STEP
```

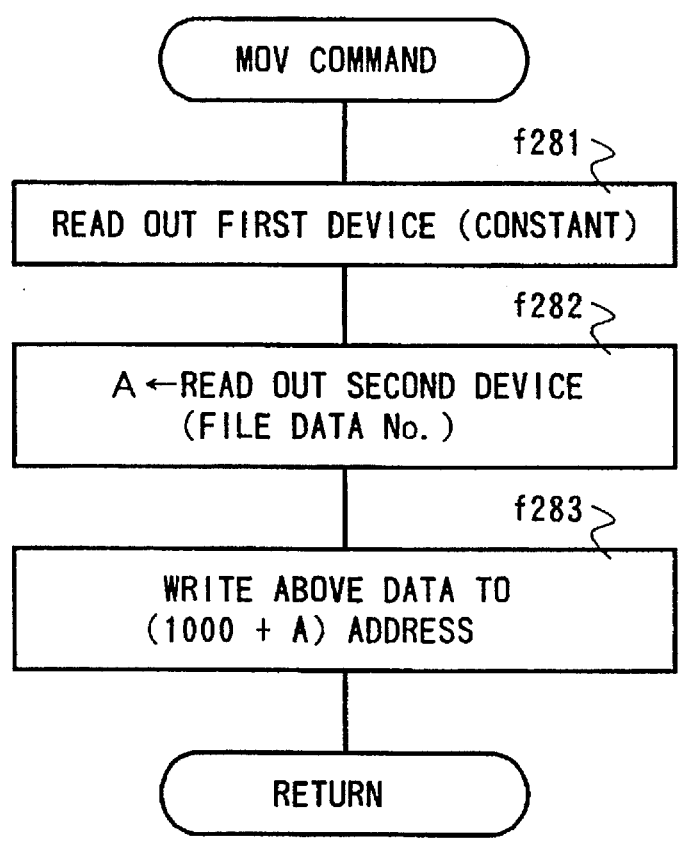
F I G. 3 7

F I G. 3 8

| 3 0 0 0 | COMMENT DATA OF X0 |
| --- | --- |
| | COMMENT DATA OF X1 |
| | . . . . |
| | COMMENT DATA OF X20 |
| | . . . . |

PROGRAMMABLE CONTROLLER AND PROGRAM CAPACITY CHANGING METHOD THEREOF

FIELD OF THE INVENTION

The present invention relates to a programmable controller and program capacity changing method thereof, especially, management of various types of data, and an execution scheme in a programmable controller.

BACKGROUND OF THE INVENTION

FIG. 29 is a block diagram illustrating an outline of a conventional type of programmable controller. In this figure, designated at the reference numeral 1 is a peripheral device, at 2 a CPU unit. In the CPU unit 2, designated at 3 is an interface section for a peripheral device which executes data transaction with the peripheral device, at 4 a computing processing section, at 4A is an H/W computing circuit executing a portion of a sequence program at a high processing speed, at 5 a microprogram memory to store a program or programs for the system therein, at 6 a memory for user to store user data such as a sequence program, file memory, or comments therein, at 7 a scan time memory to store scan time for the entire program, at 8 a pointer table to store address data for a pointer, and at 15 a user memory allocation data memory.

At 16 is a group of units each connected to the CPU, at 16a an input unit, at 16b a high speed counter, at 16c an output unit, at 16d an analog unit, at 16e a link unit, at 17 a group of devices each connected to a unit group 16 connected to the CPU, at 17a a limit switch, at 17b a sensor, at 17c a valve adjustor, and at 17d a motor.

A description is made hereinafter for operations of a conventional type of programmable controller with reference to a concrete example thereof.

FIG. 30 shows an example of user memory allocation in a peripheral device, and in this case 1000 bytes are allocated to a sequence program, 2000 bytes for file data, and 3000 bytes for comments. User allocation data memory 15 and allocation of a user memory 6 in this case are as shown in this figure (program area 6a, file data area 6b, comment area 6c). Referring to this figure, designated at 15-1 is a header address of an area where a sequence program is stored, at 15-2 an header address of an area where data is stored, and at 15-3 a header address of an area where comment data is stored. In actual operation, when a sequence program read or write demand is issued from a peripheral device 1, the output unit 16c starts data write from each header address.

FIG. 31 shows a concrete example of configuration of a program area 6a shown in FIG. 30. In this figure, blocks corresponding to functions BK1 to BK5 are allocated to the execution sequence. Herein, BK1 indicates a functional block (starting processing) such as checking conditions for start or initial data setting which is executed only at a start. BK2 is a functional block (input processing) where a processing for an input unit 16a or a high speed counter 16b which has fetched a signal from such a device as the limit switch 17a or the sensor 17b is executed. BK3 is a functional block (operation control processing) where computing is executed upon an instruction from the BK2. BK4 is a functional block (output processing) where output to the valve adjustor 17c or the motor 17d is executed via the output unit 16c or the analog unit 16d upon an operational instruction from the BK3, and in this block FEND FEDN is a command indicating completion of the processing.

A series of processes from BK1 to BK4 is called a scan, and the processes are executed successively and cyclically as shown in right side of FIG. 31, thus actual control being executed. BK5 is a functional block (subroutine processing) such as processing of numerical data called and executed only when required. This configuration is an example of a configuration of a sequence program. Generally a sequence program is divided into several functional blocks as described above, and each block is developed by several persons.

Next, a description is made hereinafter of a program read or write operation. FIG. 32 is an example of operations in a peripheral device for reading a program, and setting as to whether the entire program should be read or only a specified range thereof should be read is performed. If only a specified range of program should be read, a start step and an end step are specified. FIG. 32 shows a method of specifying to read BK2 in FIG. 31. The same is true for write operation.

Next, a description is made of operations for adding new contents to a program memory. FIG. 33 shows an arrangement of each block in a sequence program, and in this figure, designated at 6a (1) is memory contents before change, at 6a (2) memory contents after a change of program steps in the BK2 block from 100 to 200 to 6a (1), 6a (3) memory contents in the case where a new block of BK6 has been added to 6a (2), at 1 (2) operations from a peripheral device corresponding to 6a (2), and at 1 (3) operations from a peripheral device corresponding to 6a (3). Herein BK6 is a block of input check processing, which must be executed between BK2 and BK3.

Next a description is made of operations for executing a program. When executing a program, at first a head of the sequence program memory, namely a head of BK1, is set at an address for starting execution, and then the blocks BK1, BK2 and BK3 are successively executed. In this process, simple commands are processed by a hardware computing circuit 4A, and other commands are processed by a microprogram stored in the microprogram memory 5. When a FEND command is detected, a specified END processing is executed, and again the program is cyclically executed from BK1. BK5 is not executed cyclically, and is executed only when a CALL command is executed. Also a processing time required for a series scan is stored in the scan time memory 7 by END processing.

Next a description is made of operations of a pointer. FIG. 34 shows examples of programs in BK1, BK2 and BK4. Herein JMP is a command for jumping to a specified pointer, and the CALL command is a command for calling a subroutine at the specified pointer. It should be noted that the pointer numbers for each block should not be redundant. MOV command is a command for transferring a constant to a file memory, and LEDC is a command for displaying a comment by a specified device on a display unit.

FIG. 35 shows a configuration of the pointer table 8, and this table is set before execution of a program. If a pointer does not exist, it is assumed that an address of a large program not existing actually such as a value for FFFFH has been stored there.

FIG. 36 shows a flow chart for processing JMP command. When JMP command is detected, the pointer No. is read out from the sequence program memory 5 (f141), and the program address is computed according to contents of the pointer management table 8 in FIG. 29 (f142). Then, a determination is made as to whether the value is an existing address or not (f143), and if it is determined that "the pointer address is larger than the maximum address" an error processing is executed on the recognition that there is no pointer (f145). On the contrary address is equal to or smaller the maximum, a processing for jumping to the specified address is executed (f144), thus execution of the command being finished.

FIG. 37 shows a flow chart for processing MOV command. At first, after a constant for a first device is read out (f281), a file No. for a second device is read out (f282), and the data is written in an address obtained by adding a value indicated by the file data header address 15-2 refer to FIG. 30 for the user memory allocation data 15 (f283).

FIG. 38 shows configuration inside comment data. FIG. 39 shows a flow chart for processing LEDC command which is a comment read command. At first, stored comment data is read out from the comment header address 15-3 refer to FIG. 30 for the user memory allocation data 15 (f291), and the data is displayed on a display unit (f292).

In relation to the method of managing a plurality of data, especially of programs, the method as disclosed Japanese Patent Laid Open publication No.205203/1989 exists, but in this method, when change in system capacity occurs, it is necessary to read all programs into the peripheral device side.

Furthermore, as for the processing time, as it is possible to detect only the entire processing time, it has been difficult to grasp what portions of the processing sequence require a long processing time. Especially, a program size used in a programmable controller is apt to become larger year by year in association with scaling up at a system. Up to only a few years ago, at most several thousand steps were enough for a program, but recently, programs each consisting at 100,000 steps or more are sometimes required. It is practically impossible to analyze the processing time by checking each step one by one in case of such a large size program. However, the performance of a programmable controller largely contributes to the real-time processing capability of a control system as a whole. Accordingly, it is quite important to shorten a processing time in each block by checking each block in detail.

Japanese Patent Laid Open Publication No.259910/1990 discloses a file management system for the case of a numerical control (NC). However, the significant feature of this system is that absolute addresses are employed in the file management section. Otherwise, the file system is not largely different from those in general personal computers. Moreover, it is necessary to successively execute programs according to factory automation techniques, so this system is hardly applicable to a programmable controller generally requiring a high speed responsiveness.

Also, Japanese Patent Laid Open Publication No.222047/1991 discloses effective utilization of unused storage areas, but it is necessary to successively search for empty areas to acquire continued areas.

The conventional types of programmable controller has been based on user memory management systems as described above, and there exist the following problems.

First, a user memory as a whole is managed according to user allocation data, so that it is not easy to change a storage capacity for programs or file data because it causes a change of absolute addresses in the storage space.

Secondly, when making a sequence program by dividing it into several blocks, the developed blocks must be compiled into a program and stored in a basic system of a CPU, so that, even when only one block of the program is changed, it is necessary to write all the blocks behind the changed block again in the CPU.

Also when the file management system used in common personal computers is stored into a programmable controller, several problems occur. Namely, a sequence program is generally executed at a high speed in a hardware computing circuit, so that it is difficult to stop execution of a program and jump to execution of another program during execution of a sequence program. For this reason program file data must be allocated continuously.

In addition scanning must always be executed, even for a block which is executed only at a start, which results in a waste of processing time.

Furthermore, the processing time is detected only as a whole, so that it can not be determined how long each block in the program takes for processing. Accordingly, it is difficult to take effective measures necessary for reduction of the processing time. Especially in case of programmable controller, mechanical control is provided once for every several milliseconds (mS), so that detecting a block requiring a long processing time is quite important for reducing the entire processing time and enhancing performance of the control unit.

Thirdly, as a common pointer numbering scheme is used in each block, it is necessary to allocate pointer numbers to each block before the start of a design process. On the contrary, if a program prepared previously is used again, it is necessary to change the pointer numbers already allocated to each block.

Fourthly, when making a plurality of programs by dividing each program into several blocks, the entire data memory is shared by all the programs. Accordingly, it is necessary to allocate devices to each program, and reallocation of data and change of programs corresponding to the reallocation must be carried out when a data increase is required before completion of a sequence program.

Fifthly, also when making a plurality of programs by dividing each program into several blocks, all comment data is shared by a plurality of programs, so that it is necessary to reunite the comment data each time any comment is changed or added anew.

In recent years, control systems are become more and more complicated and sophisticated, and the problems as described above have been significant obstacles to improving the designing efficiency by dividing each program into functional blocks and carrying out program designing by a plurality of persons as well as to clarifying functions of each program.

SUMMARY OF THE INVENTION

An object of the present invention is to provide a programmable controller which can easily be programmed by a plurality of programmers because it is possible to easily add or change data by allocating programs or data to a plurality of files so that the programs or data can be freely written into a memory in the CPU. Also, the programmable controller reduces scan time by freely specifying an execution form of a program. Further, it can easily check the time required for execution of a program by monitoring the time required for execution of each block of the program. Finally, it can use common pointer numbers in each program, can switch data used by each program, and use comment data provided for each program.

In a programmable controller according to the present invention, the means which can freely execute read and write of a sequence program for each function reads or writes only a block which is required to be changed or added from a CPU.

In a programmable controller according to the present invention, the means which can freely specify an execution form of each sequence program distinguishes a program executed only at a start from a program executed repeatedly, and executes each block of a program according to a prespecified order.

In a programmable controller according to the present invention, the means for monitoring a time required for executing the program will write a time required for processing a program into a scan time table each time an execution of the program is finished.

In a programmable controller according to the present invention, the means for selectively executing a common pointer which can commonly be used among programs and a local pointer which is effective only in each program makes a determination whether a pointer is a common pointer or a local one according to the pointer management table and executes the program.

In a programmable controller according to the invention, the means for switching an address for data according to the file data management memory sets a header address of data to be used at a header address of a file register having the same name as that of the program each time a name of a program to be executed is changed.

In the programmable controller according to the invention, the means for switching data according to the comment management memory sets a header address of data to be used at a header address of file comment having the same name as that of the program each time a name of a program to be executed is changed.

Other objects and features of this invention will become understood from the following description with reference to the accompanying drawings.

BRIEF DESCRIPTION OF THE DRAWINGS

FIG. 5 is a view illustrating an empty area management table according to the present invention;

FIG. 6 is a view illustrating an example of operations in a peripheral device for writing a new file according to the present invention;

FIG. 7 is a view illustrating a data processing request for writing a new file from a peripheral device according to the present invention;

FIG. 9 is a view illustrating an example of operation in a peripheral device for writing a new file according to the present invention;

FIG. 14 is a view illustrating a configuration of a program execution management table according to the present invention;

FIG. 17 is a view illustrating configuration of a scan time table for each file according to the present invention;

FIG. 19 is a view illustrating an example of a common pointer setting in a peripheral device according to the present invention;

FIG. 20 is a view illustrating an example of a program according to the present invention;

FIG. 23 is a view illustrating configuration of a file data management memory according to the present invention;

FIG. 26 is a view illustrating configuration of a comment management memory according to the present invention;

FIG. 30 is a view illustrating an example of a conventional type of user memory allocation;

FIG. 31 is a view illustrating an example of a conventional type of program;

FIG. 32 is a view illustrating a conventional type of operation for program read;

FIG. 37 is a flow chart for a conventional type of MOV command;

FIG. 38 is a view illustrating a configuration of comment data; and

DESCRIPTION OF THE EMBODIMENTS

Figure 1:
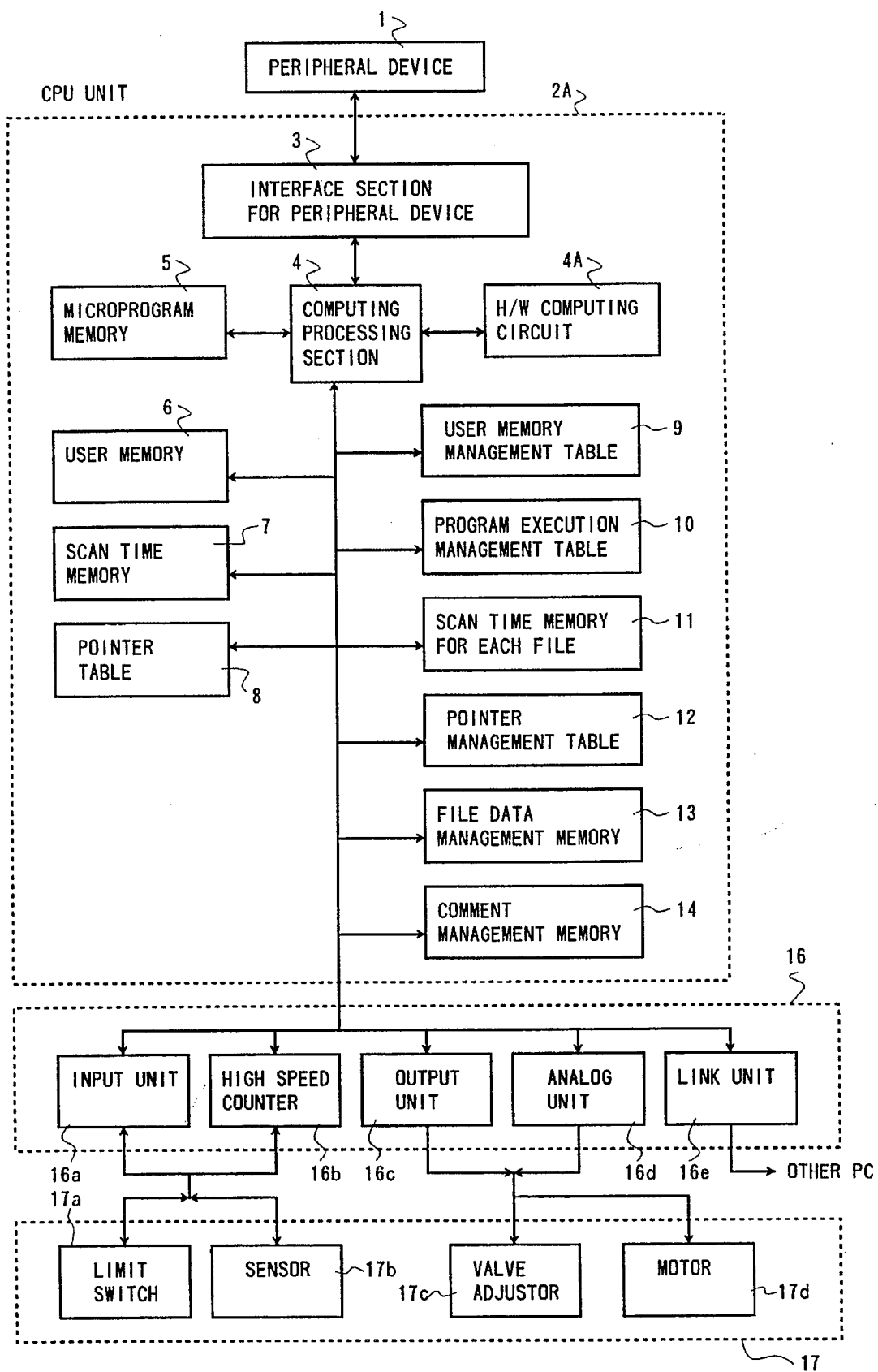
FIG. 1 is a block diagram illustrating configuration of a programmable controller according to the invention.
Figure 29:
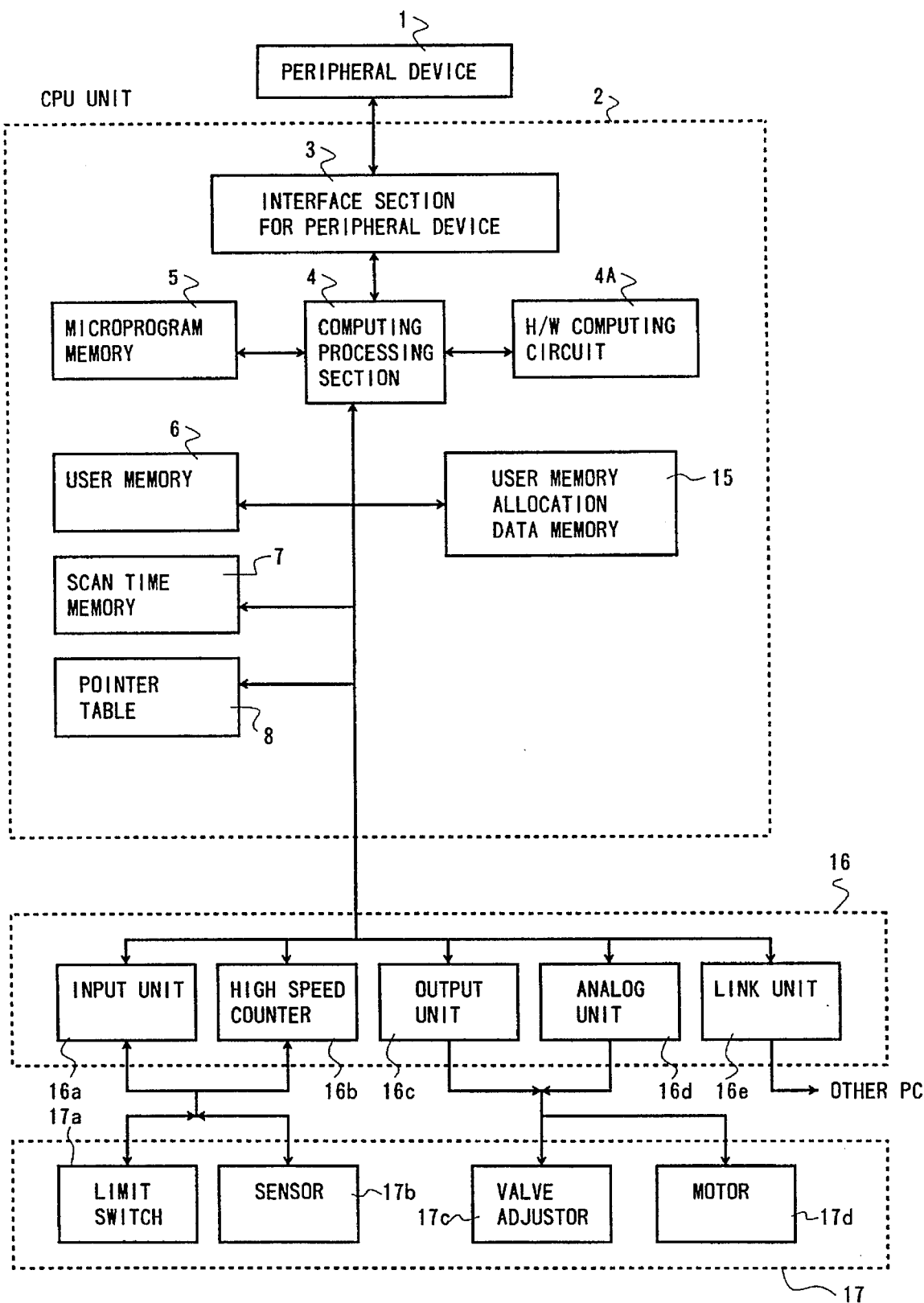
FIG. 29 is a block diagram illustrating a conventional type of programmable controller.
Figure 33:
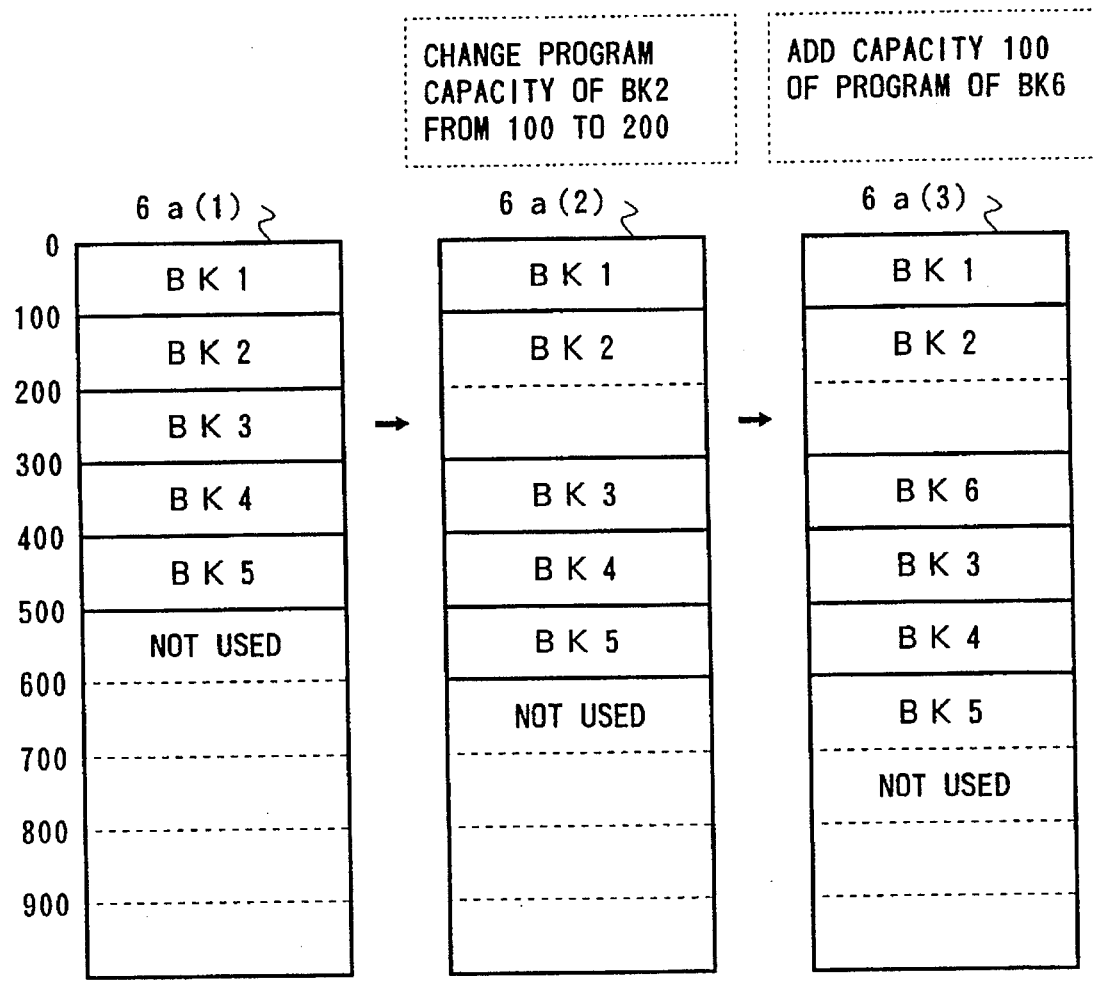
FIG. 33 is a view illustrating a conventional type of operation for program change.
Figure 34:
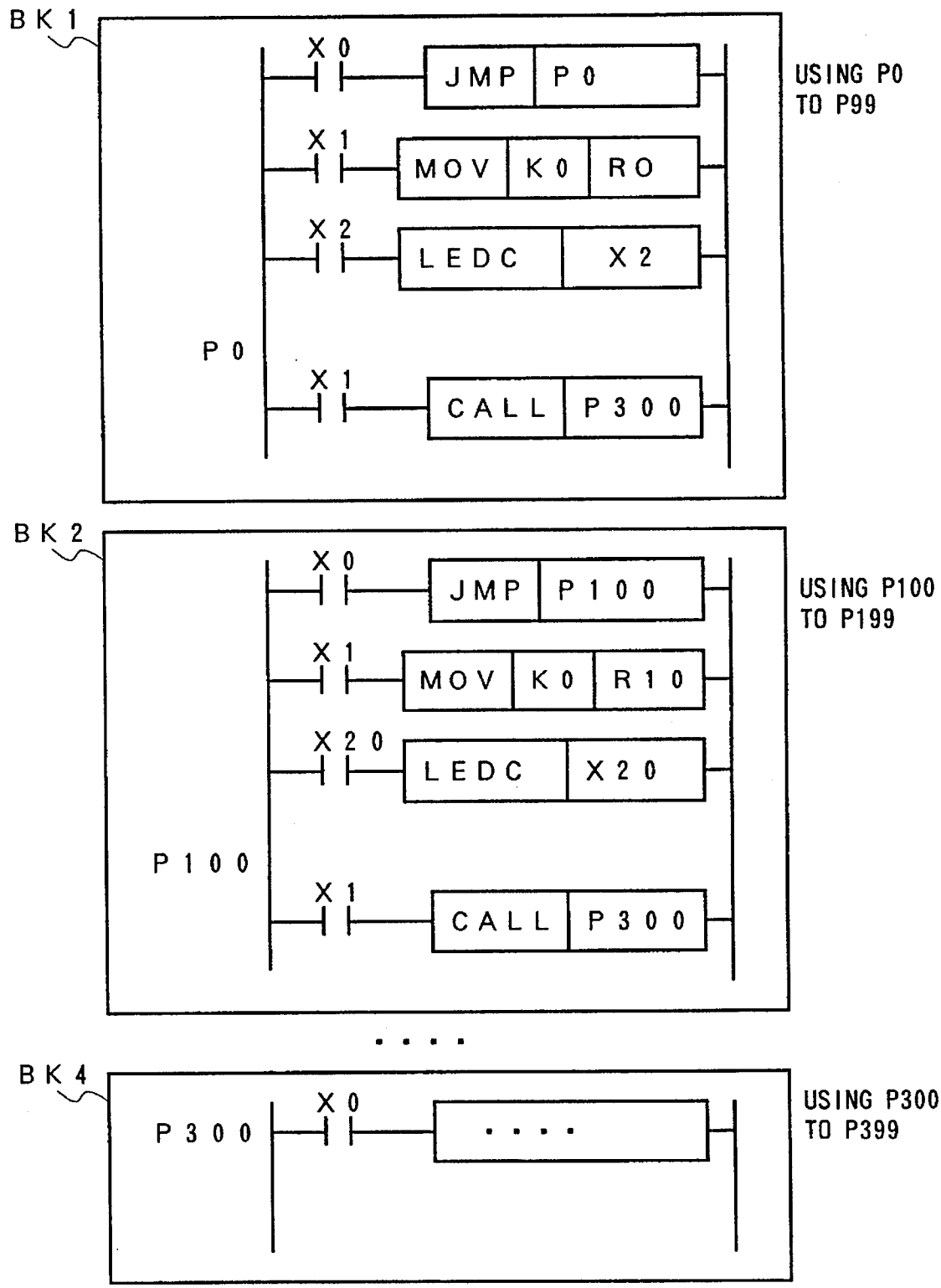
FIG. 34 is a view illustrating an example of a conventional type of program.
Figure 35:
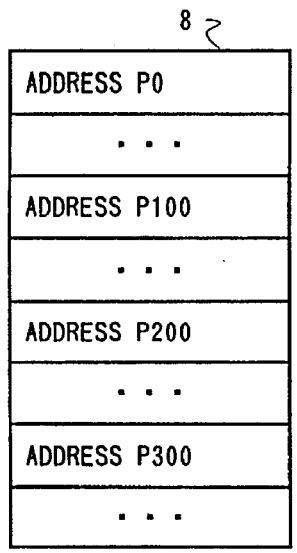
FIG. 35 is a view illustrating a conventional type of pointer table.
Figure 36:
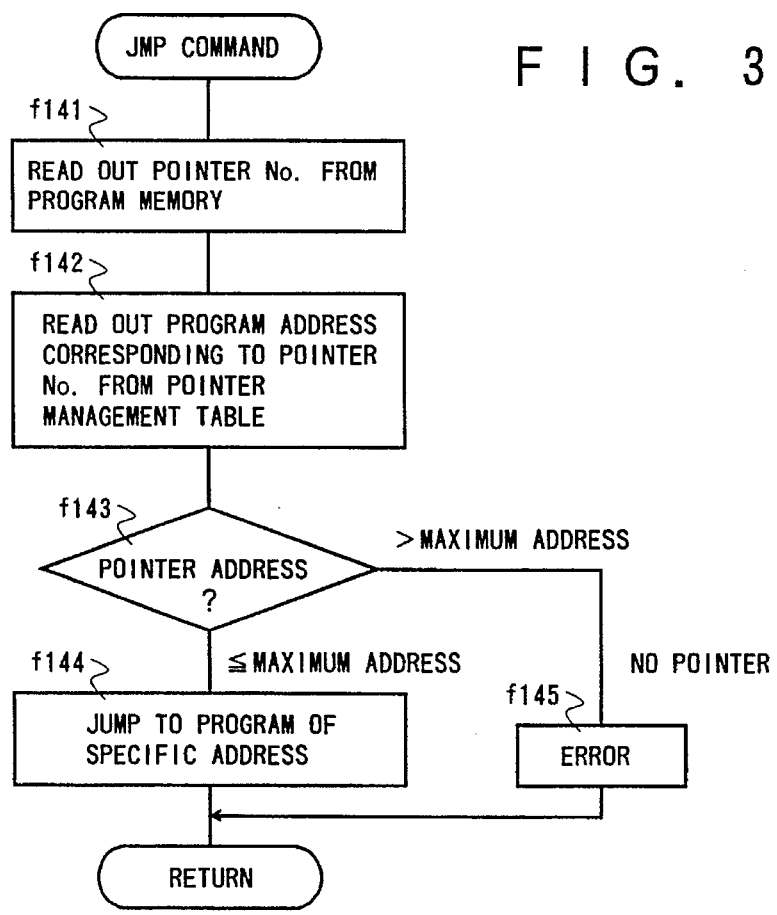
FIG. 36 is a flow chart for a conventional type of JMP command.
Figure 39:
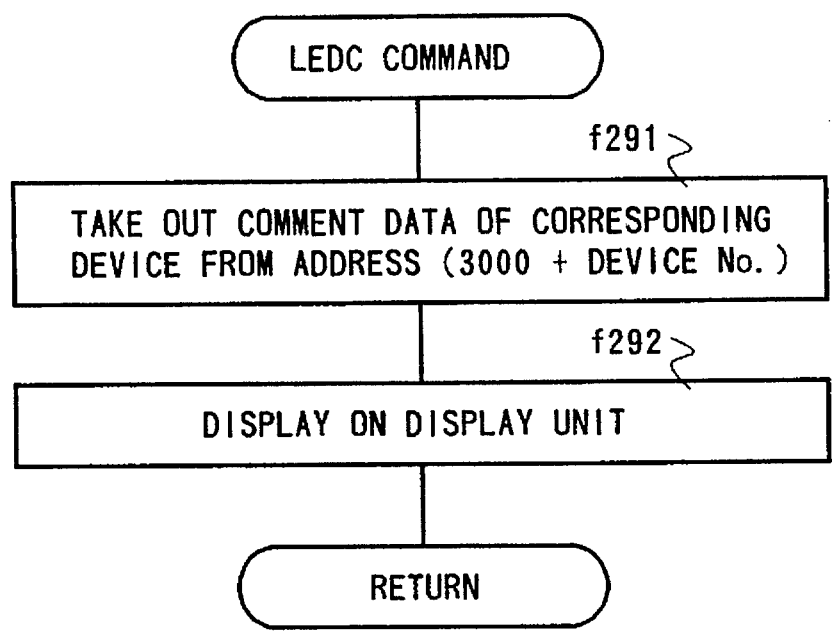
FIG. 39 is a flow chart for a conventional type of LEDC command.

FIG. 1 is a block diagram illustrating a programmable controller according to an embodiment of the present invention. Referring to this figure, the reference numeral 2A indicates a programmable controller, while the reference numerals 1 to 8 indicate the same components as those shown in FIG. 29, the conventional technology. Also in this figure, at reference numeral 9 is designated a user memory management table used for management of data such as those concerning the storage space of various types of programs or data stored in a user memory. At 10 is a program execution management table for managing execution of each program. At 11 is a scan time memory for each file in which data on scan time for each program file is stored. At 12 is a pointer management table for managing the contents of the pointer table 8, at 13 is a file data management memory for switching file data, and at 14 is a comment management memory for storing required switching comments.

Figure 2:
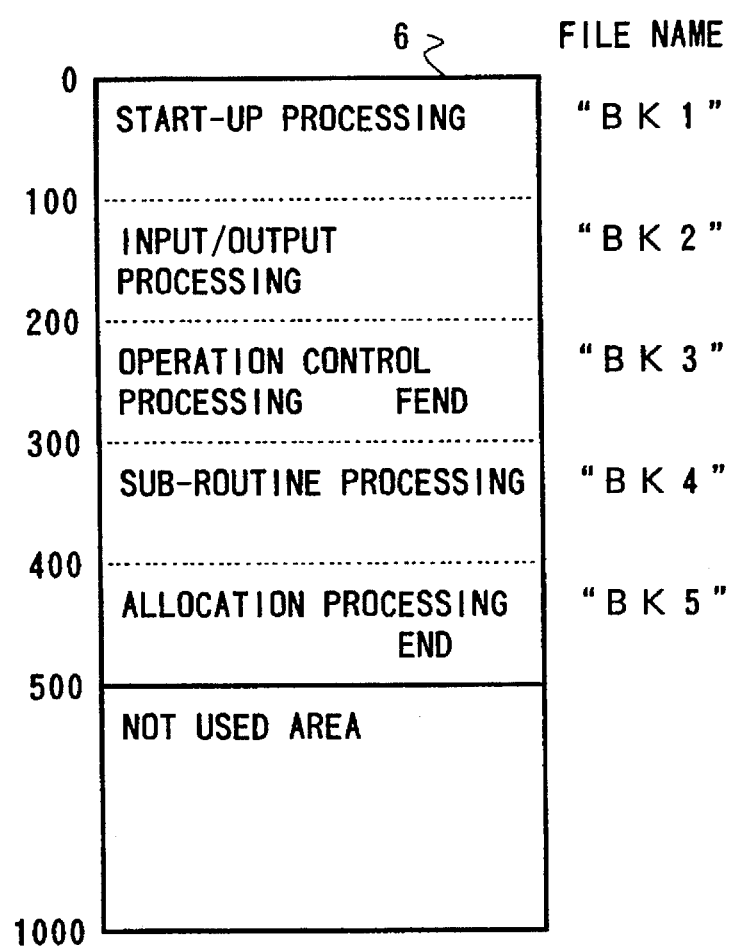
FIG. 2 is a view illustrating configuration of a user memory according to the present invention.
Figure 3:
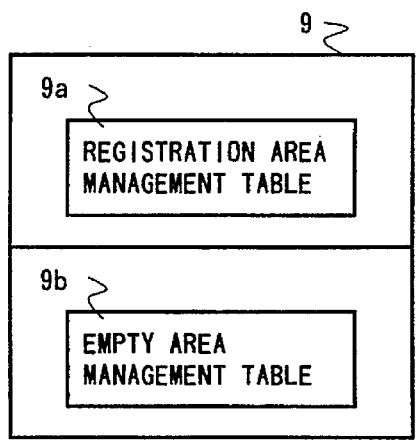
FIG. 3 is a view illustrating configuration of a user memory management table according to the present invention.

FIG. 2 shows an example of a configuration of the user memory 6, and the files BK1 to BK5 are successively stored therein. FIG. 3 shows an internal configuration of the user memory management table 9. In this figure, the reference numeral 9a indicates a registration area management table in which registration data for data registered in the user memory 6 is stored, while the reference numeral 9b indicates an empty area management table for managing empty memory space in the user memory 6.

Figure 4:
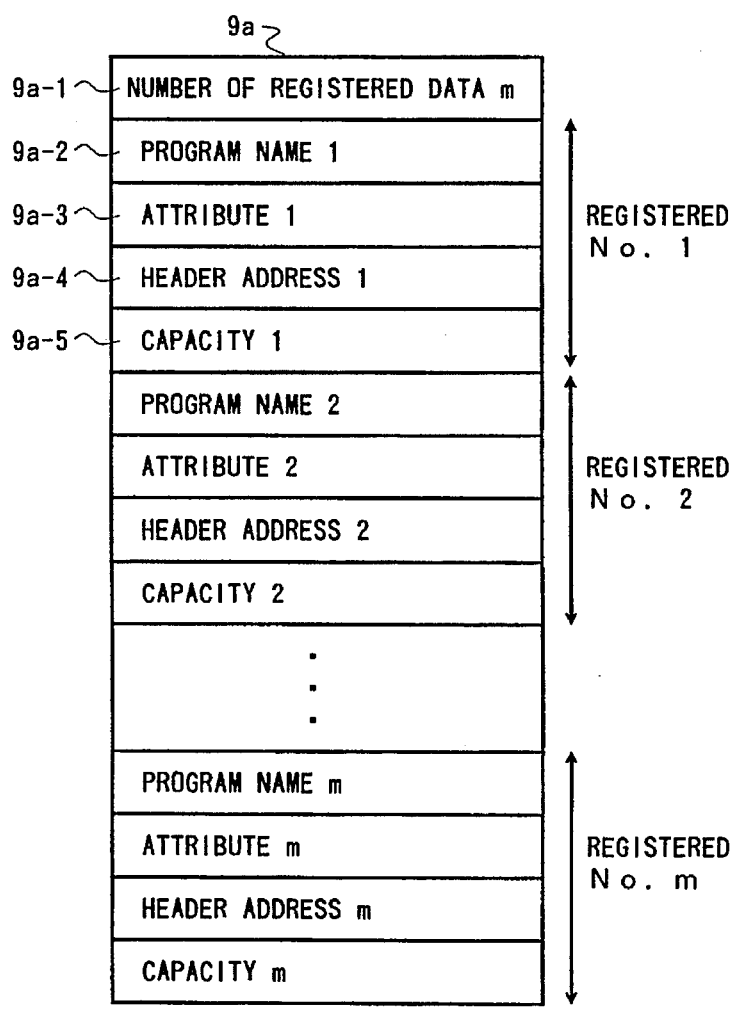
FIG. 4 is a view illustrating configuration of a registration area management table according to the present invention.

FIG. 4 shows a data configuration in the registration area management table 9a. In this figure, 9a-1 is a number of registered data m, 9a-2 is a program name for data registered first, 9a-3 is an attribute of the data such as that for determination as to whether the data is a sequence program or file data, 9a-4 is a header address on the user memory 5 from which the data starts, and 9a-5 is a capacity of the data. Similarly m pieces of data are stored in this user memory 5.

FIG. 5 shows a data configuration in the empty area management table 9b. In this figure, 9b-1 is a number of empty areas P, 9b-2 is a header address on the user memory 5 from which the first empty area starts, and 9b-3 is a capacity of the empty area. Similarly data for n pieces of empty area is stored therein.

FIG. 6 shows an example of an operation in a peripheral device for newly writing a file, and 1(4) in this figure shows a case where a program BK6 consisting of 100 steps is newly written.

FIG. 7 shows the configuration of a data processing request from a peripheral device during the operation shown in FIG. 6, and in this figure R1 indicates a data processing request for new registration, while A1 indicates response data to the request. Also R2 is a data processing request for data write, and A2 is response data corresponding to the request.

Figure 8A:
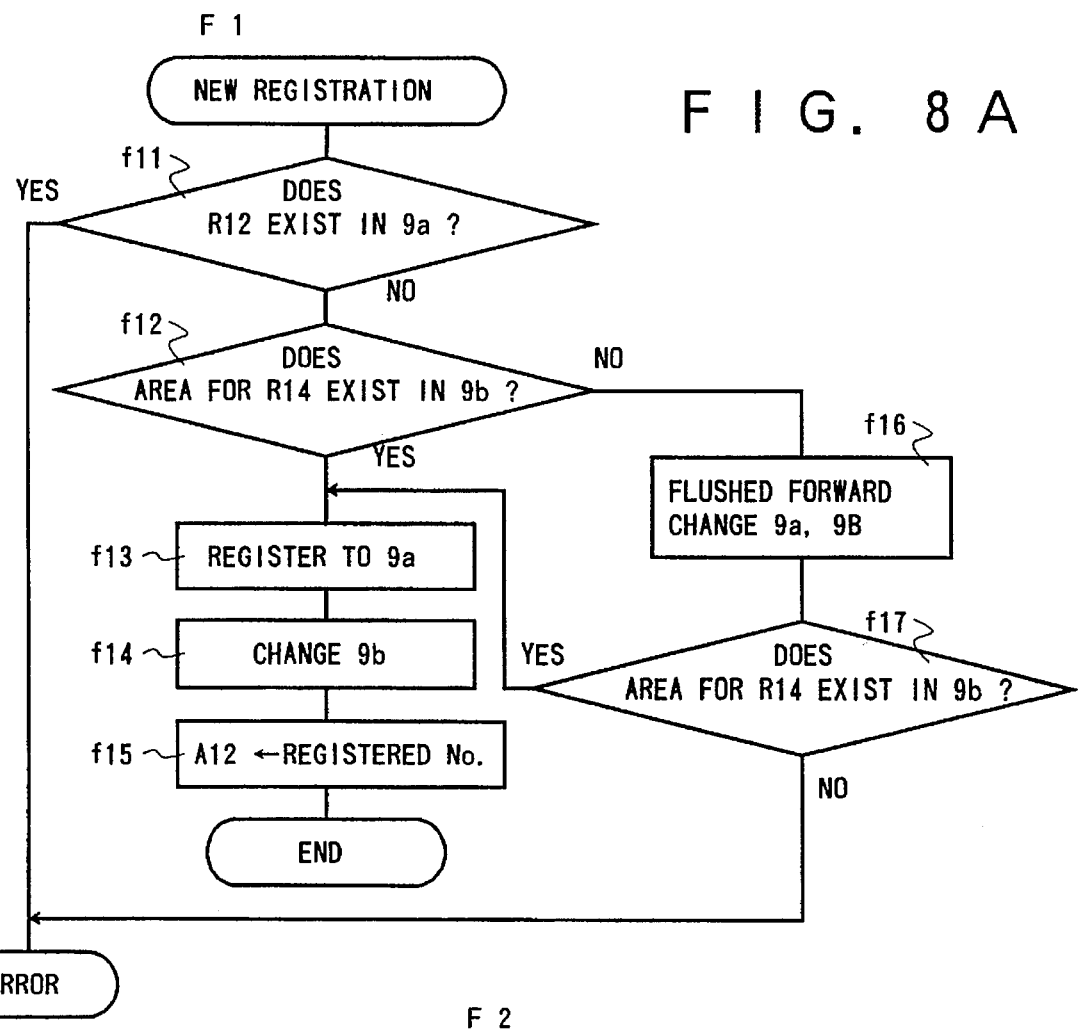
FIG. 8A is a flow chart illustrating operations of CPU for writing a new file according to the present invention.
Figure 8B:
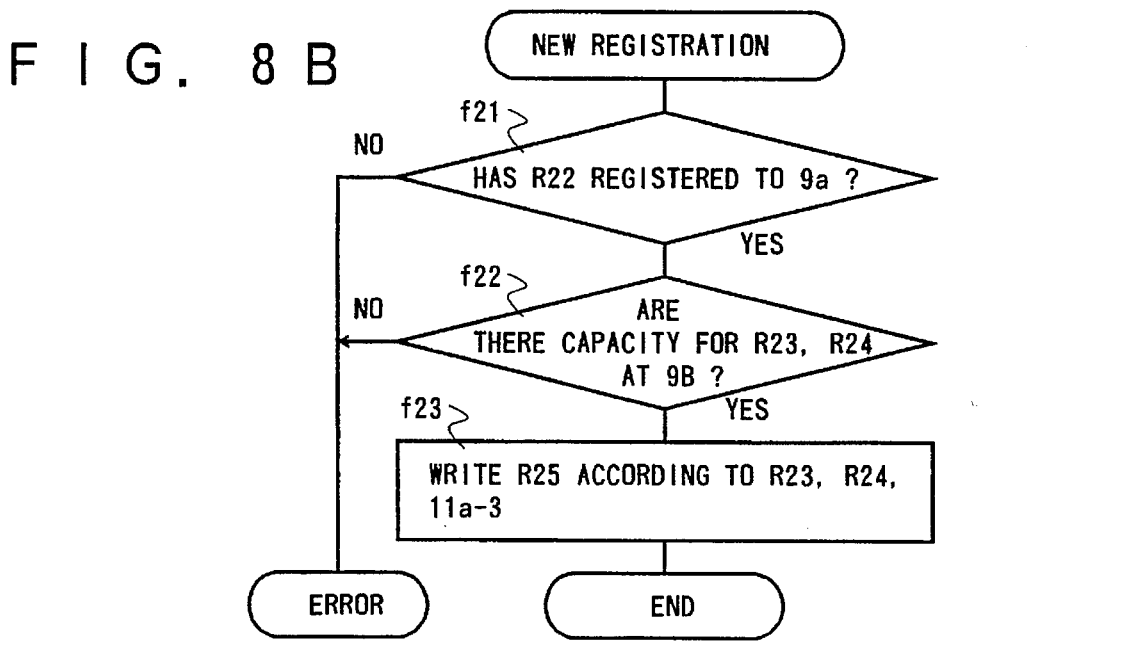
FIG. 8B is a flow chart illustrating operations of CPU for writing a new file according to the present invention.

FIG. 8A and FIG. 8B each shows a processing executed in the CPU in response to each request for data processing in FIG. 7, and F1 in FIG. 8A indicates a processing corresponding to the data processing request R1, while F2 in FIG. 8B indicates a processing corresponding to the data processing request R2.

Figure 10:
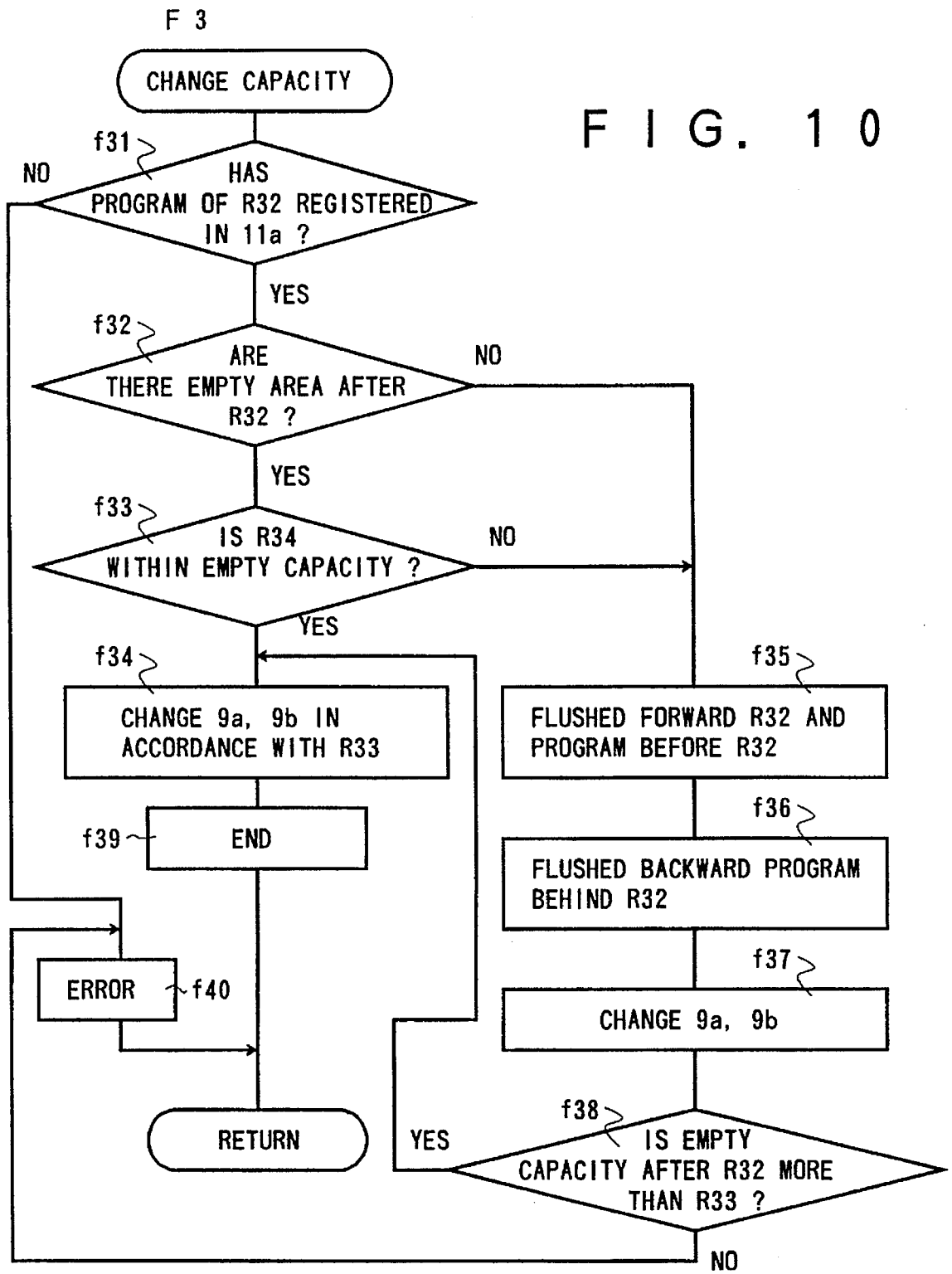
FIG. 10 is a flow chart illustrating operations of CPU for changing a file capacity according to the present invention.

FIG. 9 shows an operation for changing a capacity of a file in a peripheral device as well as a data processing request R3. Also in this figure is shown a case where a number of steps in a program BK2 is increased by 100 steps. F3 in FIG. 10 shows a flow chart of a processing in the CPU corresponding to R3.

Figure 11A:
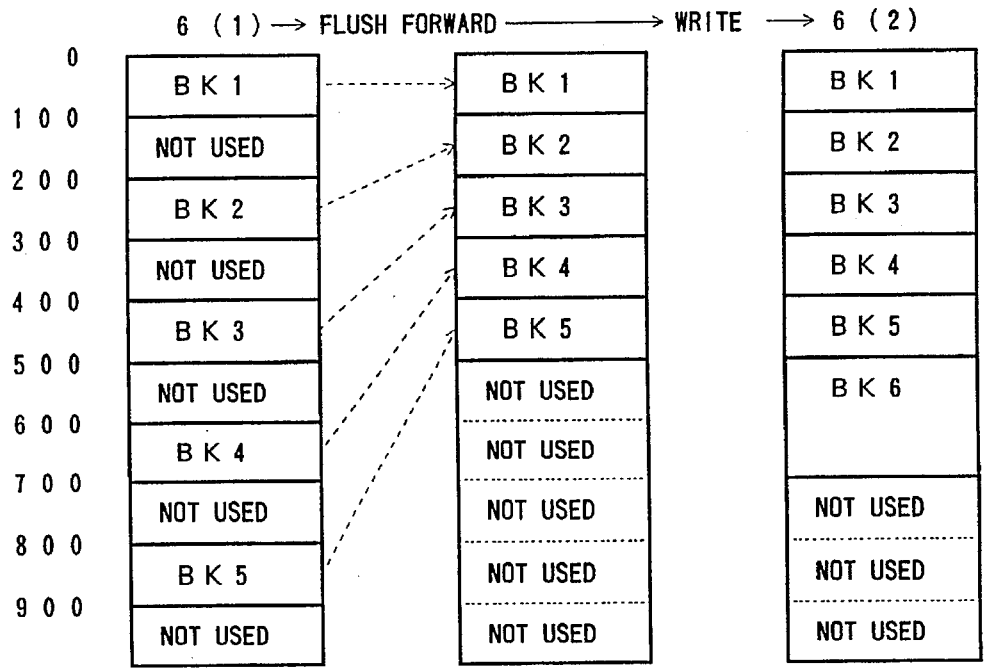
FIG. 11A is a view illustrating an example of status shift in a user memory according to the present invention.
Figure 11B:
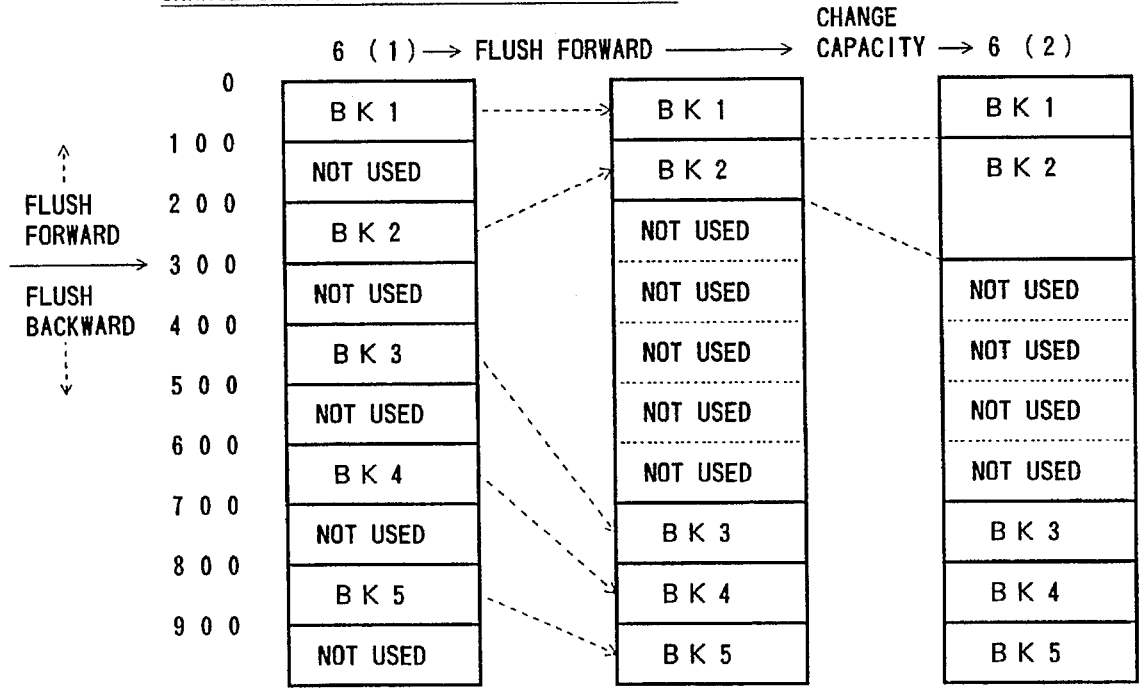
FIG. 11B is a drawing illustrating an example of status shift in a user memory according to the present invention.

FIG. 11 shows the contents of the user memory 6 when operations shown in FIG. 6 and FIG. 9 are executed. FIG. 11A shows a case where BK6 having a capacity of 200 is added, while FIG. 11B shows a case where a capacity of BK2 is changed from 100 to 200, and 6 (1) shows a state before execution of the operation shown in FIG. 6, 6(2) shows a state after execution of the operation shown in FIG. 6, and 6(3) shows a state after execution of the operation shown in FIG. 9.

Figure 12A:
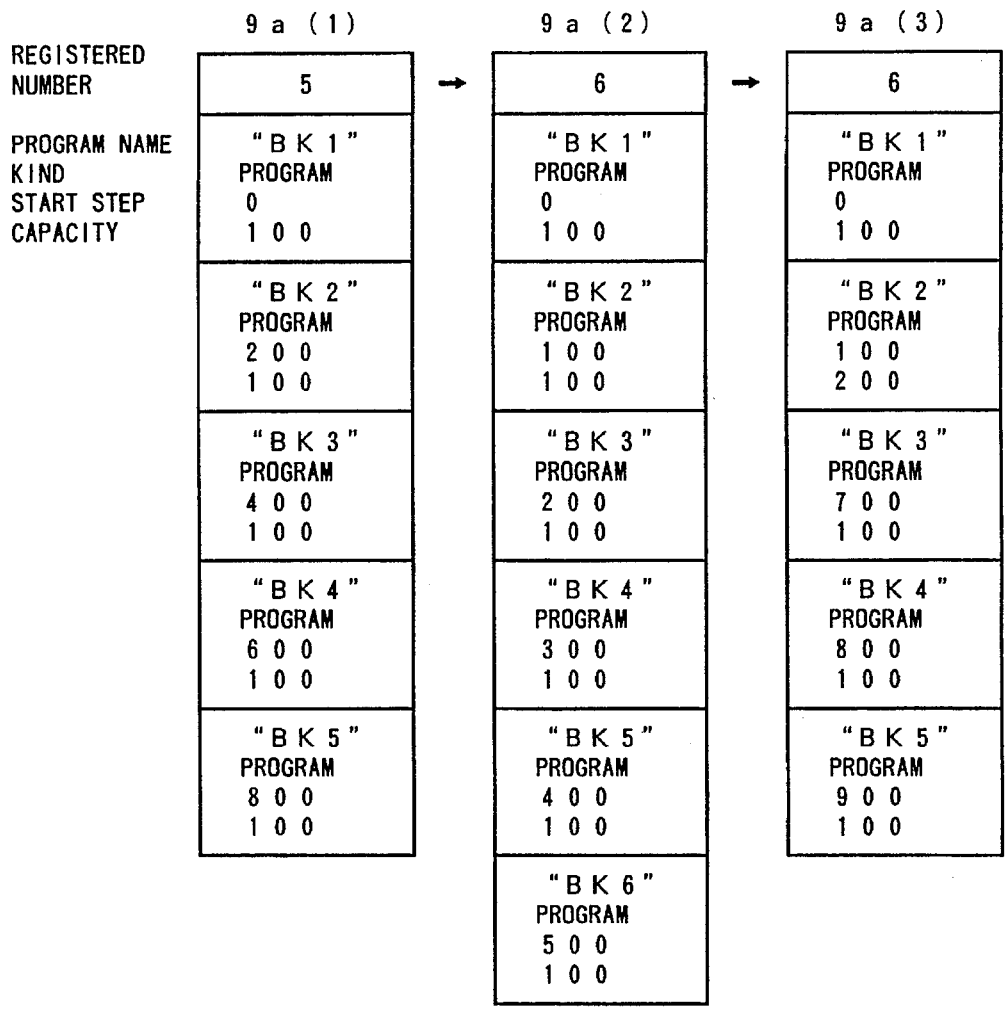
FIG. 12A is a view illustrating an example of status shift in a user management table according to the present invention.
Figure 12B:
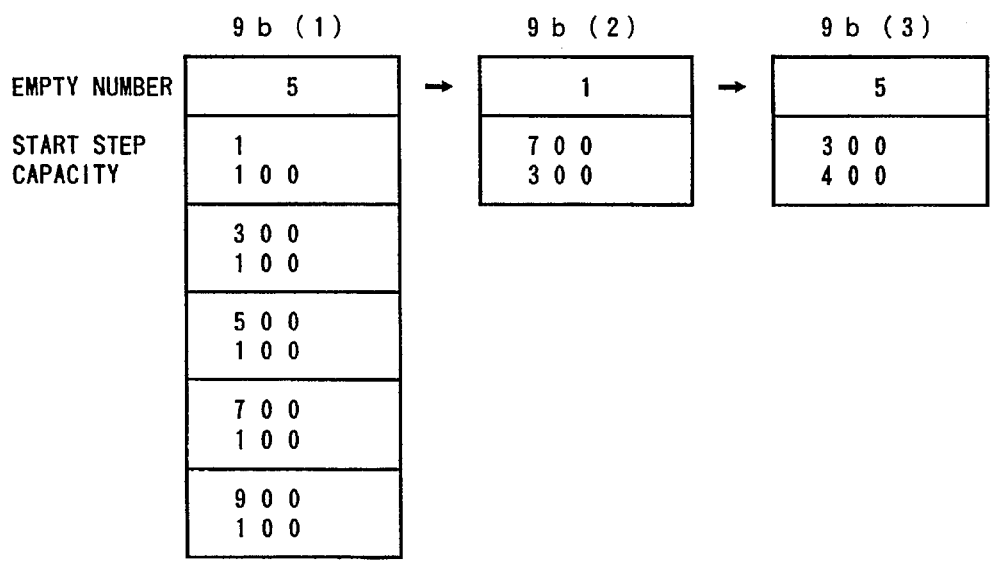
FIG. 12B is a view illustrating an example of status shift in a user management table according to the present invention.

FIG. 12 shows a state of the user memory management table 9 corresponding to FIG. 11. States 9a(1) to 9a(3) in this figure correspond to 6(1) to 6(3) in FIG. 11 respectively. Herein, FIG. 12A shows a state of a registration area control table, while FIG. 12B shows a state of an empty area control table.

Next a description is made hereinafter for an operation. It is assumed that, as shown in FIG. 2, programs BK1 to BK5 have been stored in the user memory 6. Then, a configuration of the registration area management table is as shown by 9a (1). Namely 5 files in all are stored therein, and for instance, the second file registered therein is a sequence program having the program name of "BK2", indicating that 100 bytes from the 100th byte are used for storage of the file. Then the empty area management table is as shown by 9b (1). Namely 9b (1) indicates that there is one empty area and a capacity of 500 bytes from the 500th byte is available.

Next a description is made of an operation for writing a new file as shown in FIG. 6. At first, the request R1 for new registration shown in FIG. 7 is issued from the peripheral device 1 to the CPU. The processing performed by the CPU then is described below according to the flow chart F1 in FIG. 8A. At first it is checked whether a program name R12 included in the data processing request exists in the registration management table 9a or not (f11), and if the name exists, a signal indicating an error is issued. If the program name does not exist, the empty area management table 11b is checked to determine whether a capacity for the data processing request R14 is available or not (f12). If the capacity is available, the data processing request is registered in the registration management table 9a (f13), and the contents of the empty area management table 9b is changed (f14).

Then, the registration No. in the registration management table 9a is set in registration No. A12 in response data A1, and with this operation the processing is finished (f15). If any empty area does not exist in f12, all files are flushed forward (f16), the same checking as in f12 is executed again (f17). If the memory space for storing the data processing request is still short, an signal indicating an error is issued. But, if the data processing request can be stored, the processing is removed to f13. This is because, when a file once registered is deleted, a number of empty areas increases and the capacity continuously available decreases.

When registration of a new file is complete, the data write request R2 is executed in the peripheral device 1. The processing then is described below according to the flow chart shown in FIG. 8B. At first whether the registration No. R22 exists in the registration table 9a or not is checked (f21), and if the registration No. does not exist, a signal indicating an error is issued. If the registration No. exists, whether the offset address R23 and the write capacity R24 are within a capacity range shown by 9a-5 or not is checked (f22), and if they are within the capacity range, write data R25 is successively written according to the offset address R23 and the write capacity R24 (f23). In this process, the actual header address for writing is a value obtained by adding the offset address R23 to the contents of the header address 9a-4.

With the operations above, the contents of the user memory 6 is changed to those shown in 6 (2) in FIG. 11, while the contents of the user memory management table is changed to those shown in 9a (2) and 9b (2) in FIG. 12.

Next a description is made for the operation of changing a file capacity as shown in FIG. 9. At first, the data processing request R3 is issued from the peripheral device 1 to the CPU. The processing executed by the CPU then is described below according to the flow chart F3 in FIG. 10. At first, whether or not the program name R32 exists in the registration management table 9a is checked (f31), and if the program name does not exist, a signal indicating an error is issued. If the program name exists, whether an empty area exists just behind the corresponding file or not is checked by referring to the empty area management table 9b (f32). If an empty area exists just behind the corresponding file, whether an additional capacity R34 for the data processing request R34 is within the empty capacity or not is checked (f33), and if the required additional capacity is within the empty capacity, the contents of the registration management table 9a as well as the contents of the empty area management table 9b is changed (f34), and operation is terminated (f39).

If the conditions as described in f32 and f33 are not satisfied, the specified program R32 and all programs before the specified program R32 (each having a smaller header address) are flushed forward (f35), while programs behind the specified program R33 (each having a larger header address) are flushed backward (f36), and also contents of the registration management table 9a as well as of the empty area management table 9b is changed (f37). Then checking similar to that in f33 is executed again (f38), and if an adequate capacity is available, control shifts to the processing in f34, and if an adequate capacity is not available, a signal indicating an error is issued (f40).

With the operations described above, the contents of the user memory 6 is changed to those shown in 6 (3) in FIGS. 11A and 11B, while the contents of the user memory management table is changed to those shown in 9a (3) and 9b (3) in FIGS. 12A and 12B, respectively.

Figure 13:
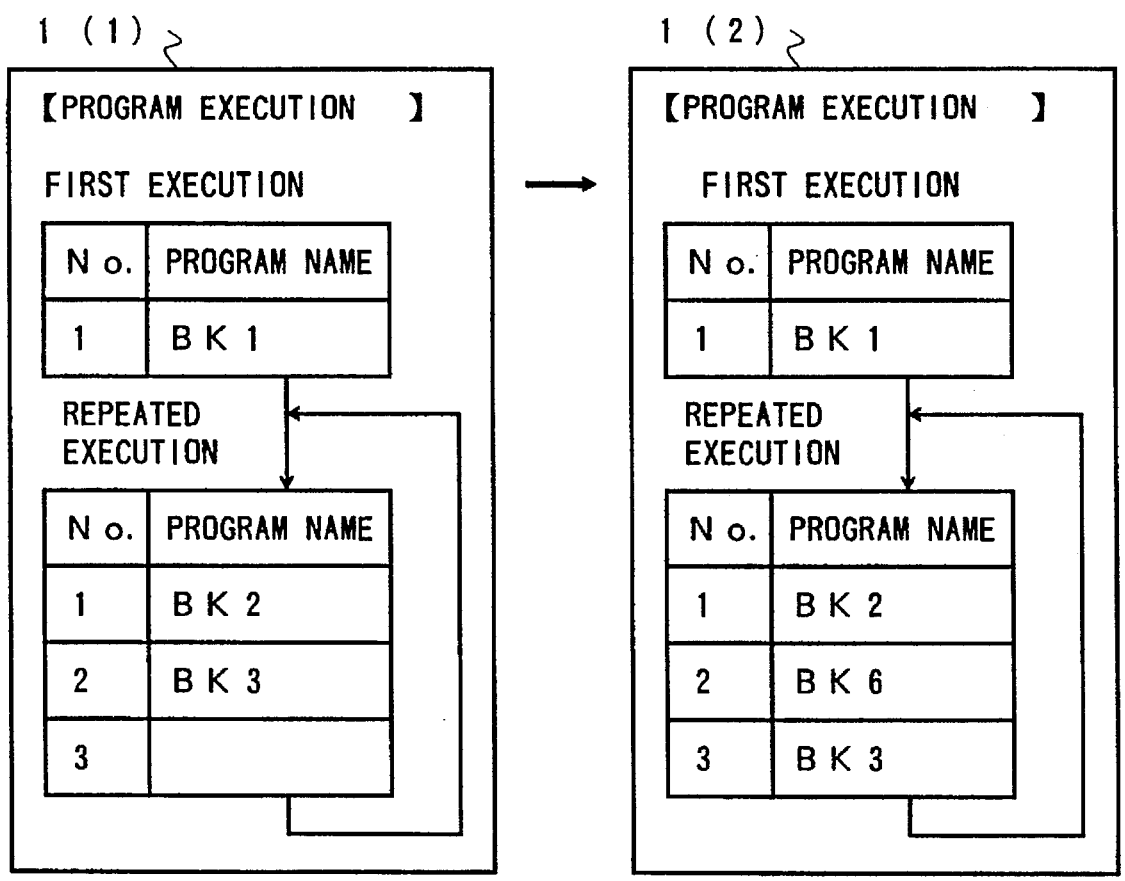
FIG. 13 is a view illustrating an example of operations for program execution in a peripheral device according to the present invention.

Next, a description is made for Embodiment 2. FIG. 13 shows an example of a method for executing a plurality of programs stored in a user memory in the peripheral device 1. In this figure, 1 (1) shows a method of executing a plurality of programs allocated as shown in 6 (1) in FIGS. 11A and 11B, while 1 (2) shows a method of executing a plurality of programs allocated as shown in 6 (3) in FIG. 11A with the program "BK6" added anew.

Figure 15:
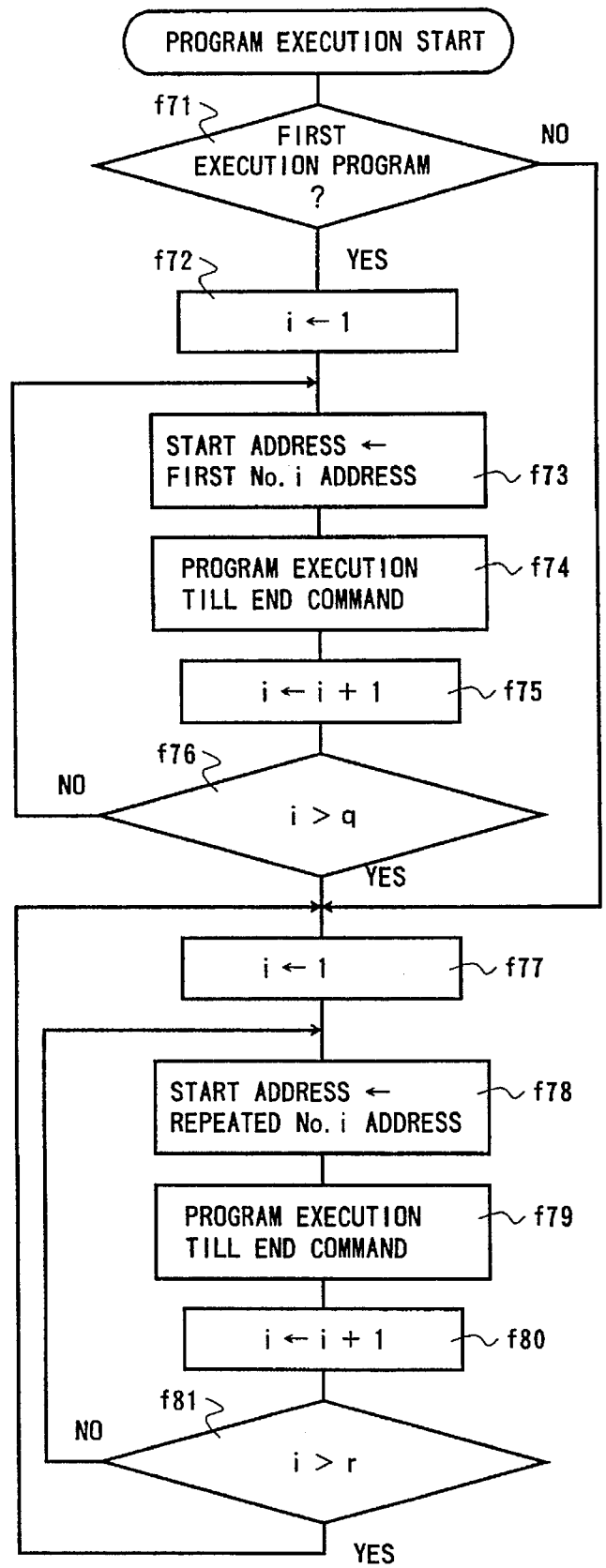
FIG. 15 is a flow chart for program execution according to the present invention.

FIG. 14 shows contents of the program execution management table 10, and 10a indicates a program execution management table for programs to be executed only at a start, while 10b indicates a program execution management table for programs to be executed repeatedly. A number of the programs to be executed, a name and a header address of each program are stored in each table. In the program execution management program 10a for programs to be executed only at a start, 10a-1 indicates a number of registered programs each executed only at a start, 10a-2 indicates the name of each program to be executed only at a start, and 10a-3 indicates a header address for the program. The same is true for 10b-1 to 10b-3 in the program execution management table 10b for programs to be executed only at a start. FIG. 15 shows a flow chart for executing a program.

Description is made below for the operations of the program. At first, a number 10a-1 of programs to be executed only at a start, a number 10b-1 of programs to be executed repeatedly, the name of programs 10a-2 to be executed only at a start, and the name of programs 10b-2 to be executed repeatedly, all in FIG. 14, are written according to the data set by the peripheral device, shown in FIG. 13, before start of program execution by the CPU. The CPU sets a header address of each program in 10a-3 or 10b-3 according to the program execution management table 9a.

When the above operations are complete, program execution is started, and operations for program execution are described below according to the flow chart in FIG. 15. At first, whether any program or programs to be executed only at a start exists or not is checked (f71), and if any program to be executed only at a start does not exist, control shifts to the processing of executing a program to be executed repeatedly (f77). If any program to be executed at a start exists, the start No. is set in a 1st address (f72), a program execution start address is set in an address corresponding to the No. (f73), and the program is executed up to the END command (f74). Then the processing is repeated p times as specified (f76), incrementing the corresponding No. one by one (f75). When the entire execution is complete in step f76, a program to be executed repeatedly is executed similarly in steps f77 to f81. It should be noted that a specified END processing is executed when execution of the program to be executed repeatedly is complete in step f81, and control shifts to a processing in step f77. Namely, only programs executed every time are processed every time.

It is quite clear that, if execution of program "BK6" is added between the execution of programs "BK2" and "BK3" as shown in 1(2) in FIG. 13, the contents of the program execution management table 10b for programs to be executed repeatedly have only to be changed beforehand.

Figure 16:
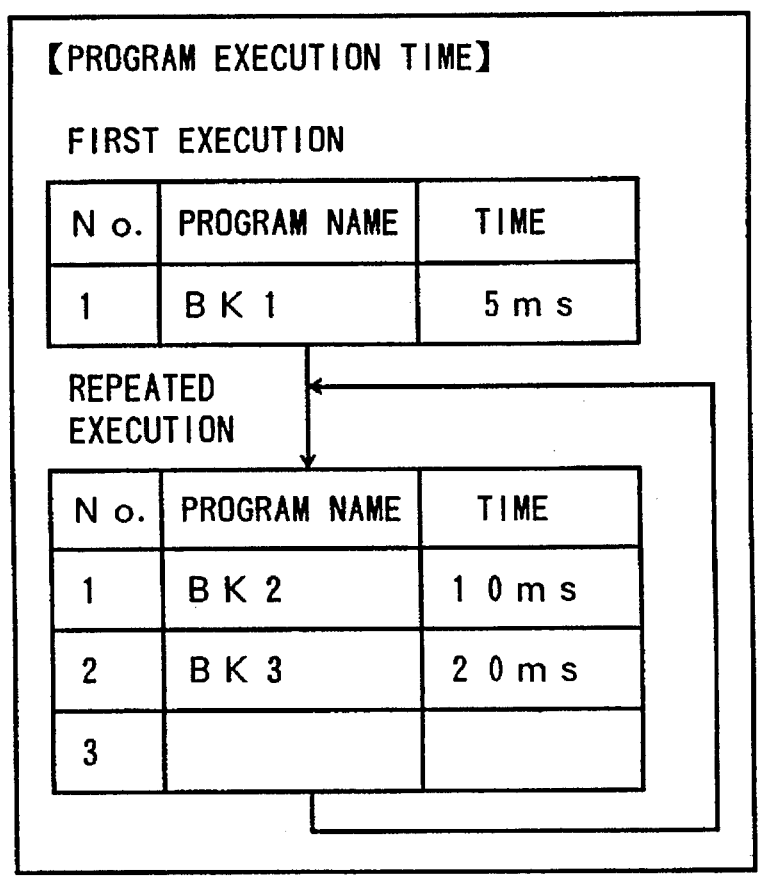
FIG. 16 is a view illustrating an example of a display of program execution time in a peripheral device according to the present invention.

Description is made for Embodiment 3. Using FIG. 16, which shows an example of a display of scan time for each file in the peripheral device 1.

FIG. 17 shows a configuration of the scan time memory 11 for each file, and in this figure the reference numeral 11a indicates a scan time table for programs to be executed only at a start in which scan time for programs to be executed only at a start is stored, and scan time for 10a-1 programs registered in the program execution management table 10a for programs to be executed only at a start is stored therein. On the other hand, the reference numeral 11b indicates a scan time table for programs to be executed repeatedly in which a scan time for programs to be executed repeatedly is stored, and a scan time for 10b-1 programs registered in the program execution management table 10b for programs to be executed repeatedly is stored therein.

Figure 18:
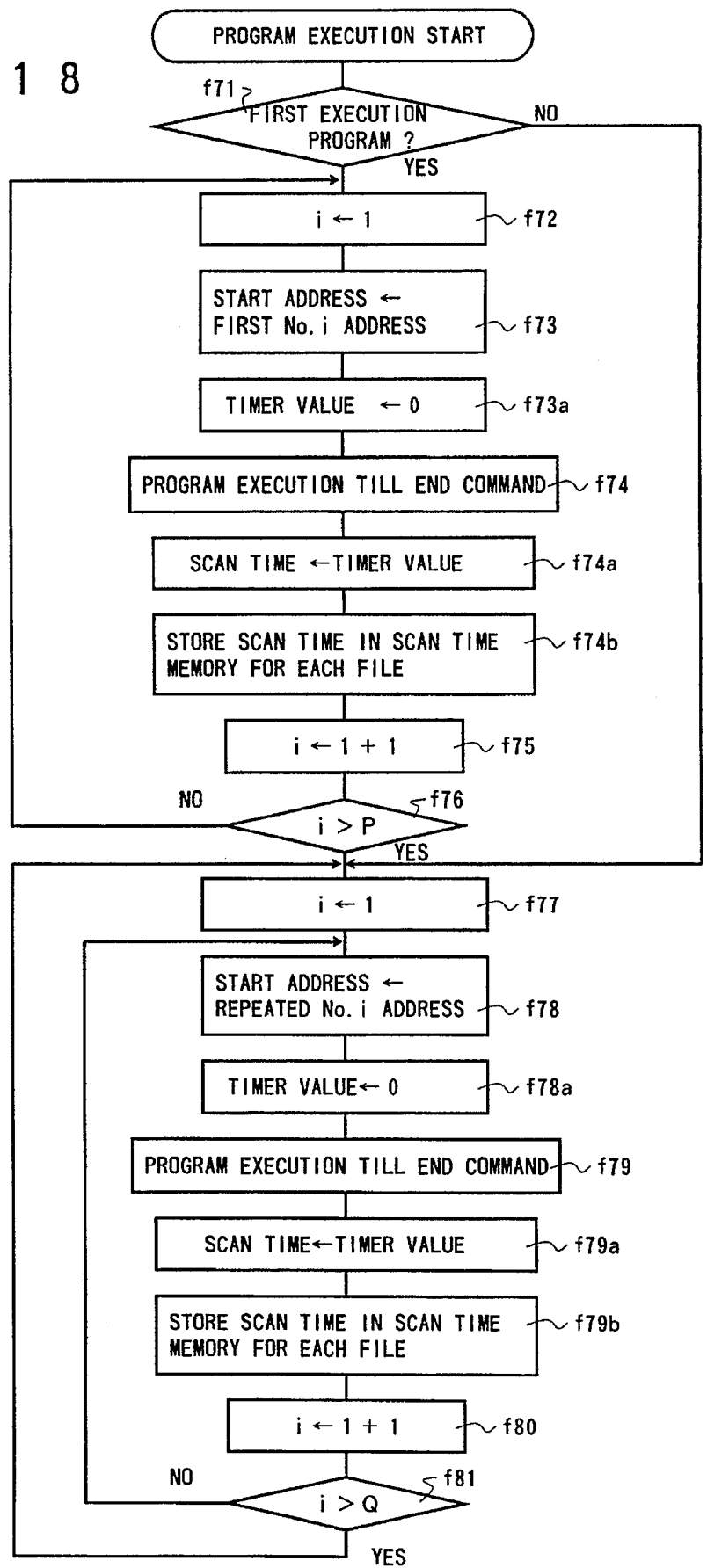
FIG. 18 is a flow chart for program execution according to the present invention.

FIG. 18 is a flow chart of an operation for measuring a scan time for each program file, and in this flow chart, operations f73a, f74a, f74b, f78a, f79a and f79b are added to those from f71 to f81 shown in FIG. 15.

Next, a description is made of several pertinent methods for certain operations. The basic method for executing the operations is the same as that described in Embodiment 2, but in case of initialization, the start address is set (f73), the measurement value of the time is set to zero (f73a), the program is executed (f74), the timer value is taken out as scan time (f74a), and the scan time is stored in the scan time memory for each file (f74a). It is obvious that the processes of f78a, f79a and f79b have only to be added also for executing programs to be executed repeatedly. The peripheral device 1 has only to periodically read and display the contents of the scan time memory for each file.

Figure 21:
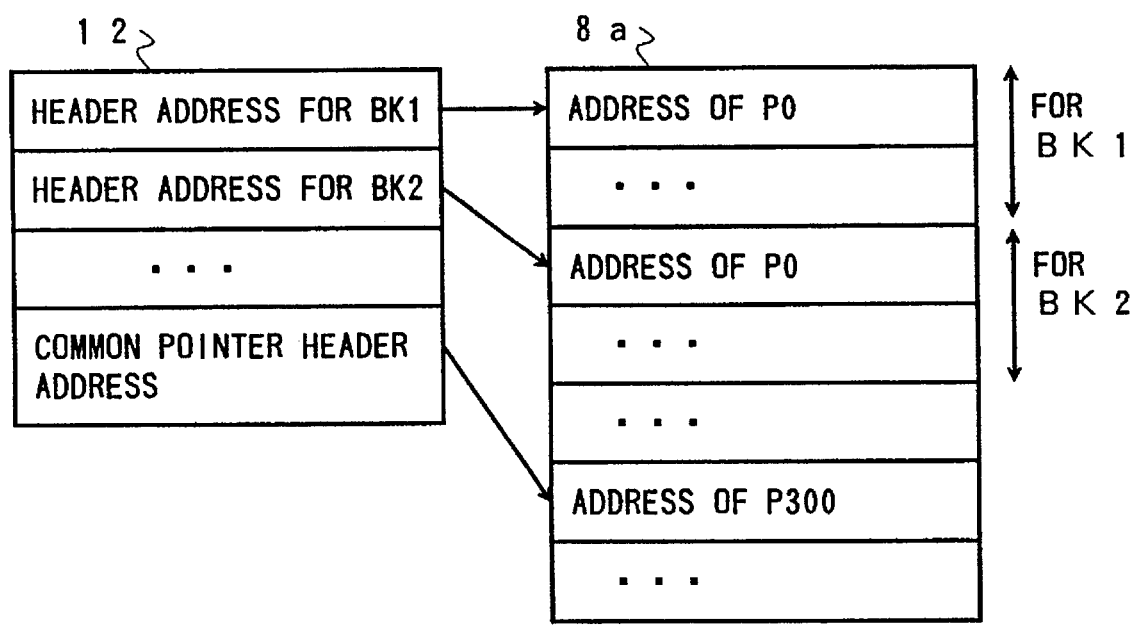
FIG. 21 is a view illustrating configuration of a pointer management table according to the present invention.
Figure 22:
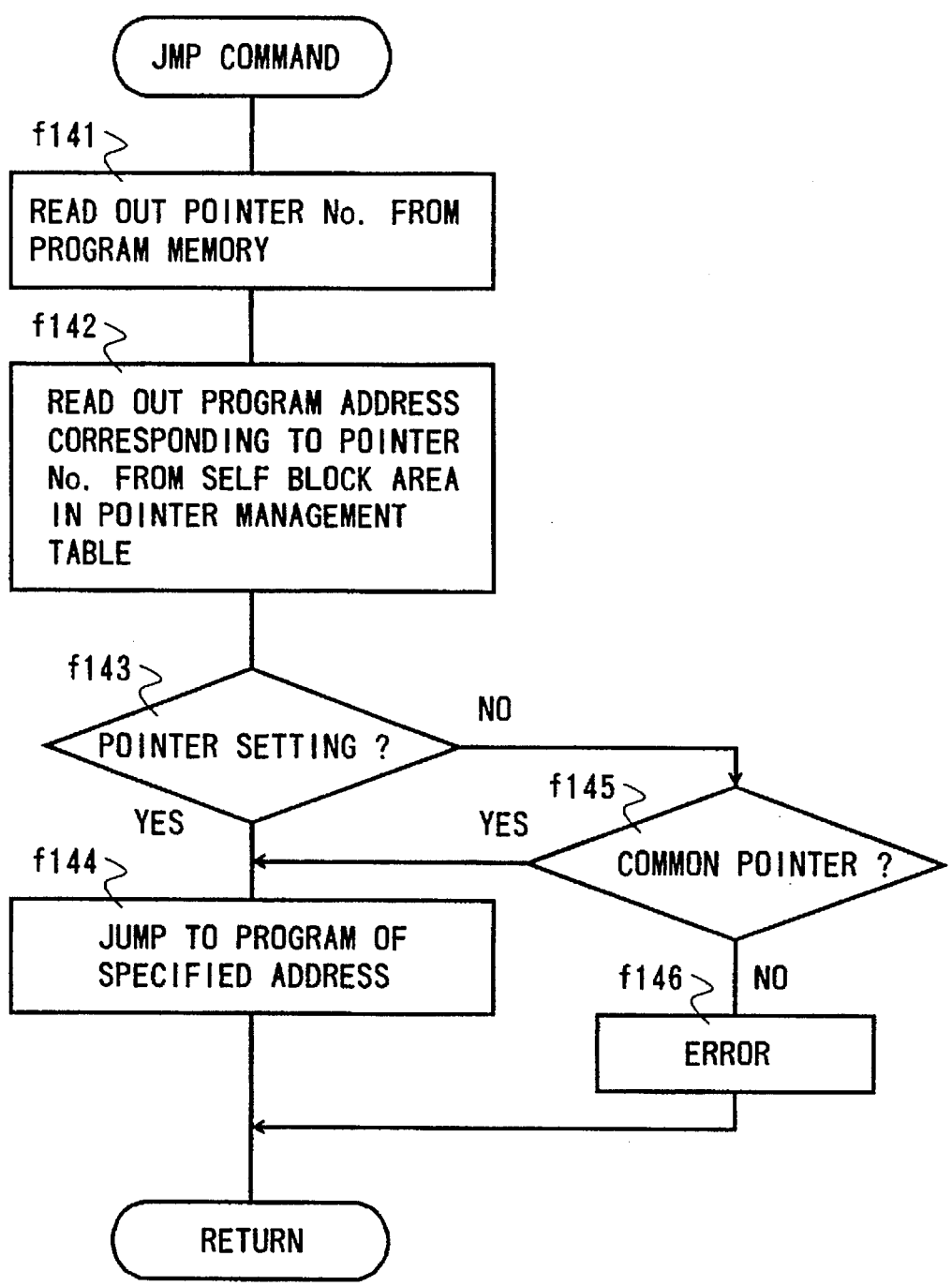
FIG. 22 is a flow chart for processing the JMP command according to the present invention.

Next, a description is made for Embodiment 4. FIG. 19 is a drawing illustrating an example of setting common pointers in a peripheral device. FIG. 20 is a drawing illustrating an example of program using both common pointers and local pointers, and a function of each command is the same as that in the conventional type of programs described above. FIG. 21 is a drawing illustrating a configuration of the pointer management table 12. FIG. 22 is a flow chart for processing JMP command.

Next, a description is made for the relevant operation. At first, a start No. for a common pointer is set in a peripheral device, as shown in FIG. 19. Pointers at and behind the specified pointer No. are those used commonly by each program. Namely, in FIG. 20, the pointers from p0 to p299 can be used by each program independently, while the pointers p300 and on can commonly be used by each program. Thus, memory allocation can be made only in one way. Then, the CPU checks the contents of each program file, and prepares the pointer table 8a and the pointer management table 12. In the a pointer management table 12 are stored a header address of pointer table from which pointers for each program start, and a header address of a pointer table from which common pointers start.

Then, when a JMP command is actually detected, processing is executed according to the flow chart as shown in FIG. 22. At first, the pointer No. is read out from the program (f141), and a sequence program address at which a pointer No. for a self-program exists is computed from the pointer management table 12 and the pointer table 8a (f142). Then, whether pointer setting has been executed or not is checked (f143), and if pointer setting has been executed, an operation for jumping to the address specified is executed (f141), thus the processing being finished. Namely, this is a processing with local pointers. If it is checked in f143 that pointer setting has not been executed, whether any common pointer is available or not is checked (f145), and if available, a jumping is executed similarly in f144. On the contrary, if not available, a signal indicates an error has issued (f146).

Figure 24:
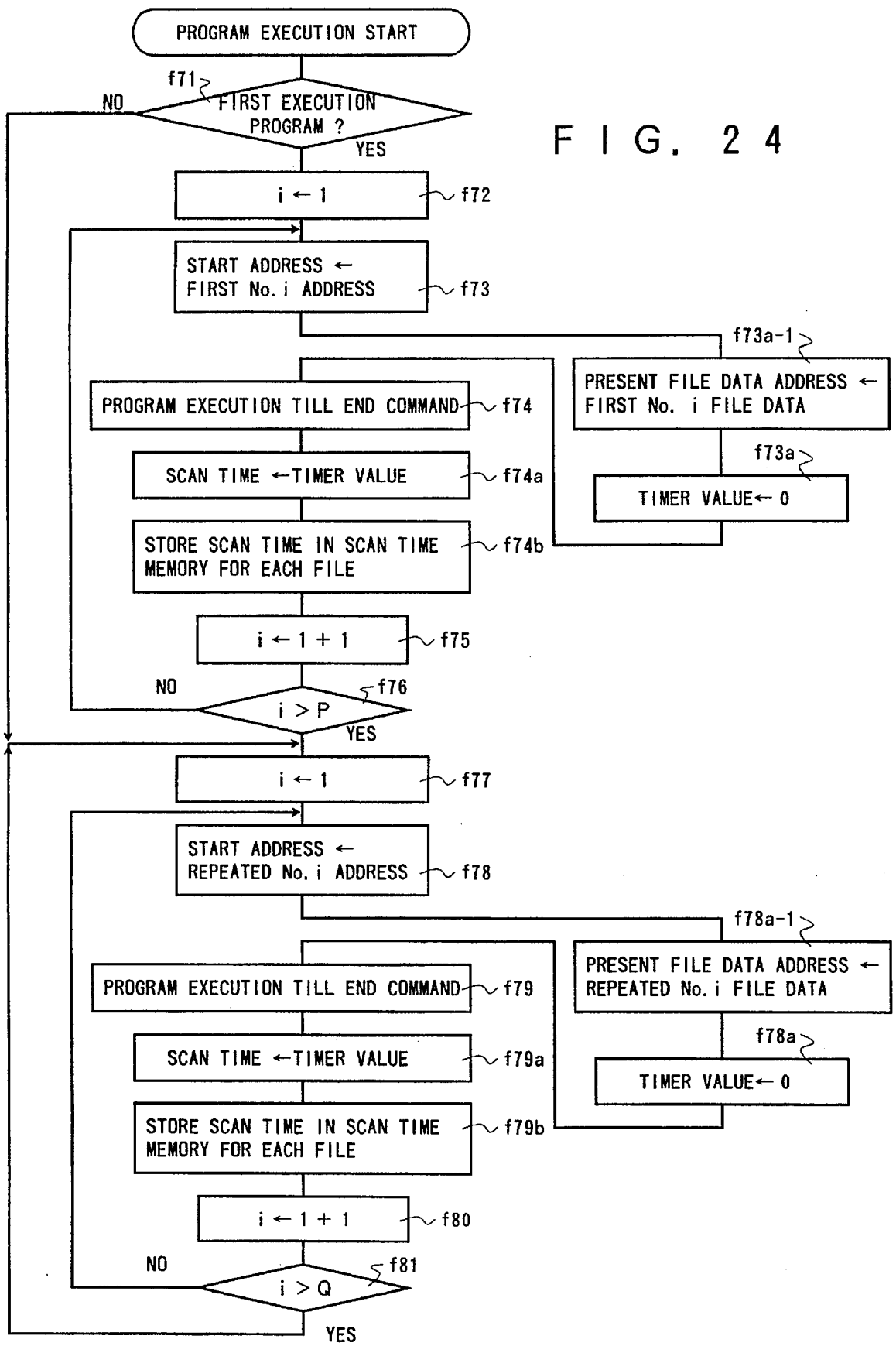
FIG. 24 is a flow chart for program execution according to the present invention.
Figure 25:
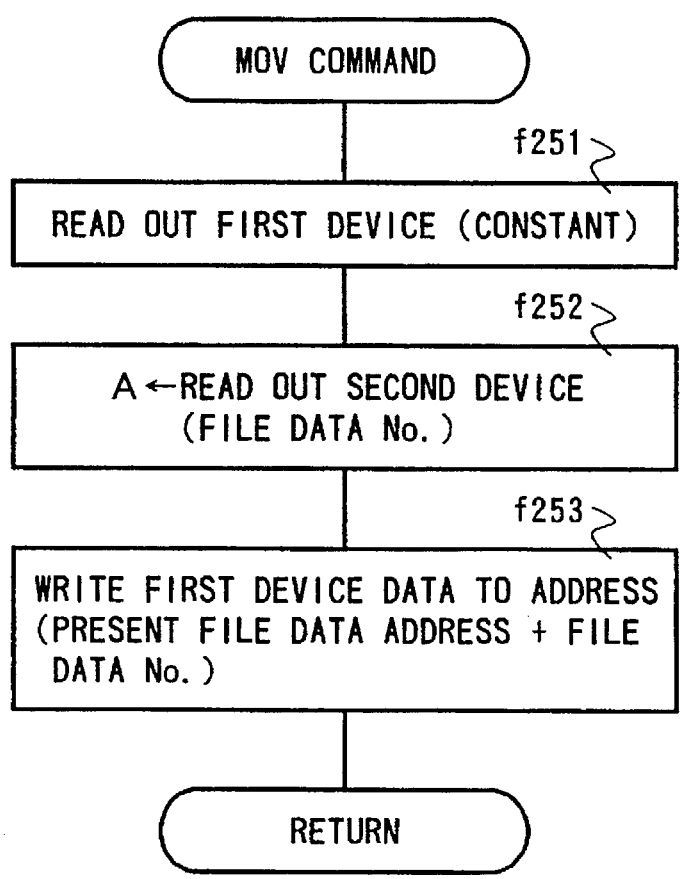
FIG. 25 is a flow chart for a MOV command according to the present invention.

Description is made for Embodiment 5. FIG. 23 shows contents of the file data management memory 13. In this figure, 13-1 indicates a header address of file data currently being specified, while 13a-1 to 13a-q indicate the header addresses of file data corresponding to programs to be executed only at a start. Also 13b-1 to 13b-r indicates header addresses for file data corresponding to programs to be executed repeatedly. FIG. 24 is a flow chart for operations for program execution. In this figure, the processing of f73a-1 and f78a-1 is added to the processing shown in FIG. 18. FIG. 25 is a drawing illustrating operations for executing MOV command to transfer a constant to file data.

Next, a description is made of the relevant operation. At first, before execution of a program, the file data management memory 13 must be prepared. For that purpose, file data having the same name as any program name registered in the program execution management table 10 should be searched from the user memory management table 9, and if such file data exists, the data should be registered successively in the file data management memory 13.

Next, a description is made of the operations for program execution with reference to flow chart of FIG. 24. The basic operation is the same as that as described in Embodiment 3, but in case of a program to be executed only at a start, a start address is set (f73), a current data file address is set in a file data address for a program No.i to be executed only at a start (f73a-1), and then the next processing should be started. Similarly, in case of a program to be executed repeatedly, the process f78a-1 has only to be added. With this operation, file data having the same name as that of any one program is always selected in the current file data address.

Next, a description is made for execution of a MOV command with reference to FIG. 25. At first, a constant for a first device is read out (f251), then a file No. for a second device is read out (f252), and a data write is executed to an address obtained by adding a value indicated by the file data header address 15-2 of the user memory allocation data 15 (f253).

Figure 27:
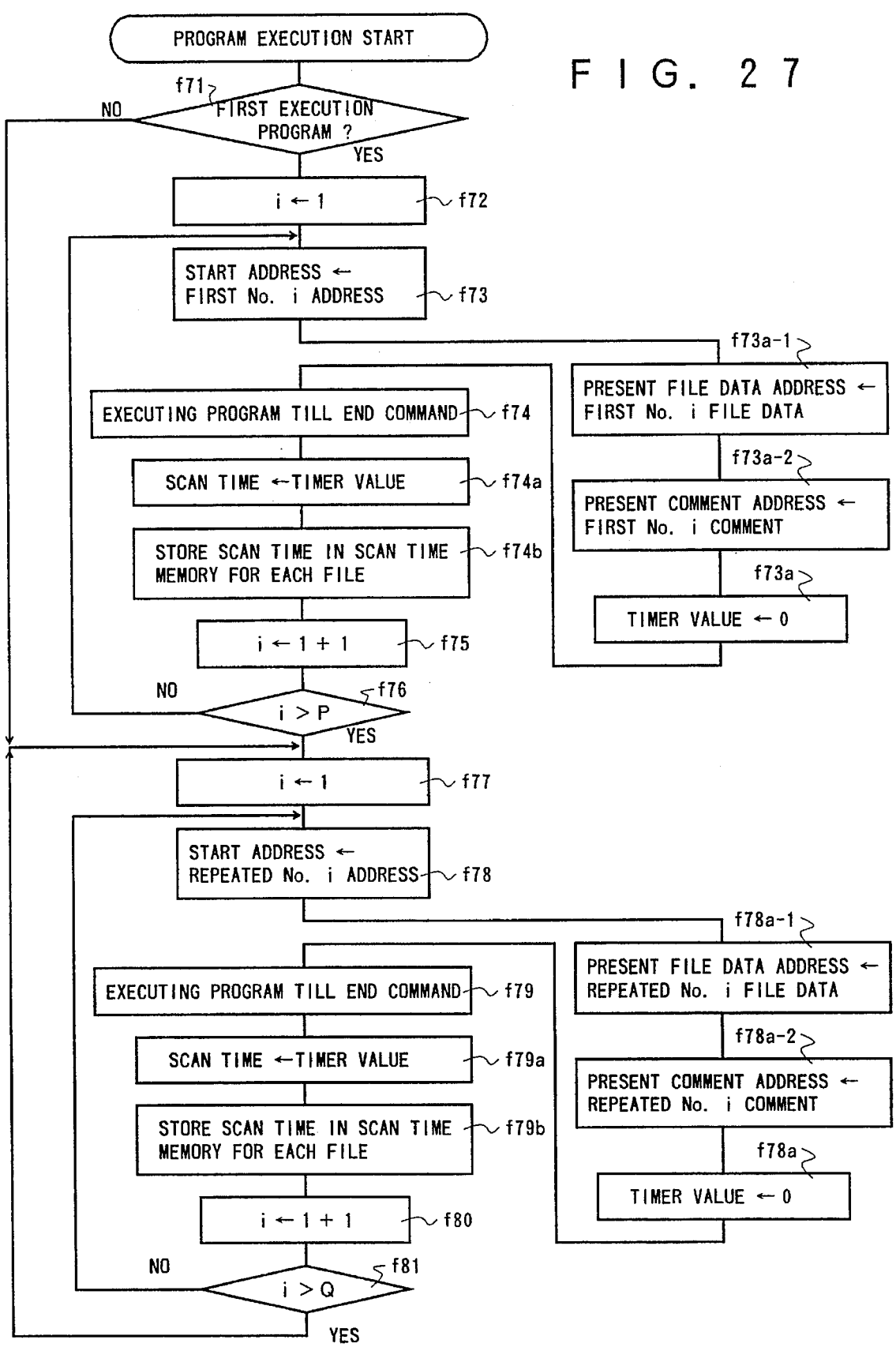
FIG. 27 is a flow chart for program execution according to the present invention.
Figure 28:
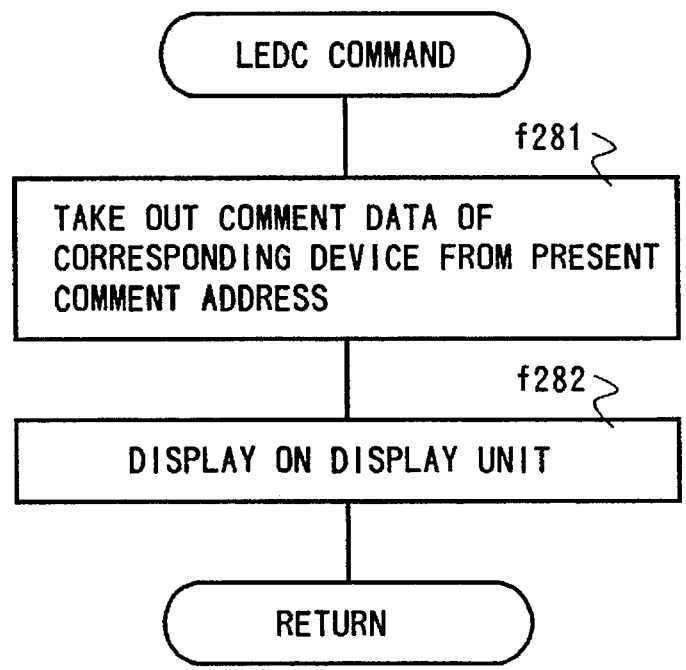
FIG. 28 is a flow chart for a LEDC command according to the present invention.

Next, a description is made for Embodiment 6, FIG. 26 is a drawing illustrating the comment management memory 14. In this figure, the reference numeral 14-1 indicates a header address of a comment currently being specified, while 14a-1 to 14a-q indicate header addresses of file data corresponding to programs to be executed only at a start. Also 14b-1 to 14b-r indicate header addresses of programs to be executed repeatedly. FIG. 27 is a flow chart for operations for program execution. Operations f73a-2 and f78-2 are added to the sequence shown in FIG. 24. FIG. 28 shows an operation for executing a LEDC command to display a comment.

Next, a description is made for the relevant operation. At first, before execution of the program, the comment management table 14 is prepared. For that purpose, file data having the same name as any program registered in the program execution management table 10 is searched from the user memory management table 9, and if such file data exists, the data should successively be registered in the file data management memory 14.

Next, a description is made of the operation for program execution with reference to FIG. 27. The basic operation is the same as that described in Embodiment 5, but in case of a program to be executed only at a start, a current file address is set (f73a-1), a current comment address is set in a file data address for a program No.i to be executed only at a start (f73a-2), and the next processing should be started. Similarly, in case of a program to be executed repeatedly, the process f78a-2 has only to be added. With this operation, comment data having the same name as a program is always specified in the current data address.

Next, a description is made for execution of LEDC command with reference to FIG. 28. After comment data for a corresponding device is taken out from the current comment address (f281), the comment data should be displayed on a display unit (f282).

As described above, as a user memory can be divided and stored by each file in a CPU, so that, even if change or addition of data is required, operation can be executed without the necessity to pay attentions to other files. Also continuity of data between files can be maintained by means for writing a file according to the present invention, so that the present invention can also be applied to execution of a sequence program for processing by hardware.

Also, as it is possible to freely specify conditions for execution such as a block to be executed only in start, waste of processing time can be prevented, which enables optimal processing. Also when a program is added anew, its assembly is very easy.

Also time required for processing each block can be monitored, blocks requiring a long processing time can easily be detected, which makes it possible to reduce a processing time efficiently.

Furthermore, it is possible to set a local pointer freely available in each block, so that it is not necessary to allocate pointer numbers to each block before start of designing, and efficiency in designing a program by a plurality of programmers can be raised.

Still furthermore, file data is automatically switched each time a program is switched to another one, file data can freely be used by each program.

In addition, as comment data is automatically switched each time a program is switched to another one, it is possible to prepare comment data according to the necessity in each program.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A programmable controller comprising:

a user memory in which a plurality of sequence programs for each process or each item to be processed and a plurality of data such as production schedule or processing data are stored as files for execution of automatic programming;

a user memory management means in which data concerning registered data for each file and empty storage area data is stored;

a write means for writing a new file from a peripheral device; and a capacity changing means responsive to the content of said user memory, for changing a capacity of the files.

2. The programmable controller as set forth in claim 1, wherein said user memory management means comprises a registration area management table for storing data concerning registered data in said user memory, and an empty area management table for managing empty space in said user memory.

3. The programmable controller as set forth in claim 1, wherein said capacity changing means is operative to check the size of available empty areas in said user memory and either to permit a registration in an available empty area or to adjust said user memory content and create a larger available empty area.

4. The programmable controller as set forth in claim 3, wherein said capacity changing means can flush stored programs in said user memory in at least one of a forward and backward direction.

5. A program capacity changing method for a user memory comprising the steps of:

making a determination as to whether a specified program exists or not;

making a determination, when the specified program exists, as to whether an empty area is present immediately adjacent the corresponding file or not;

making a determination, when an empty area exists, as to whether an additional capacity in the user memory is an empty capacity or not;

sending forward, when it is determined that the additional capacity in the user memory is not an empty capacity, or that an empty area is not present just behind the corresponding file, a specified program and programs ahead of the specified program each having a smaller address; and sending backward programs each having a larger address subsequent to the specified program; whereby a capacity of said program is changed.

6. The program capacity changing method as set forth in claim 5 further comprising:

maintaining a record for registration management and empty area management, and in response to said determination making step, when a sending forward or sending backward step is executed, readjusting said record for empty area management and record management.

7. A programmable controller comprising:

a user memory in which a plurality of sequence programs for each process or each item to be processed and a plurality of data such as production schedule or processing data are stored as files for execution of automatic programming;

a user memory management table in which data concerning storage space, attribute, or capacity of each file is stored;

a write means for writing a new file from a peripheral device;

a capacity changing means responsive to the content of said user memory management table for changing a capacity of each of the files;

a program execution management table for management of program execution by at least identifying programs to be executed at a start and programs to be executed repeatedly; and a control means for selectively executing only required sequence programs among a plurality of sequence programs stored in the user memory.

8. A programmable controller comprising:

a user memory in which a plurality of sequence programs for each process or each item to be processed and a plurality of data such as production schedule or processing data are stored as files for execution of automatic programming;

a user memory management table in which data concerning storage space, attribute, or capacity of each file is stored;

a write means for writing a new file from a peripheral device;

a capacity changing means responsive to the content of said user memory management table for changing a capacity of each of the files;

a program execution management table for registration of programs to be executed and management of program execution;

a scan time memory to store the scan time for each of the aforesaid files; and a control means responsive to said program execution management table and said scan time memory for monitoring a time required for execution of an identified sequence program for each file.

9. A programmable controller comprising:

a user memory in which a plurality of sequence programs for each process or each item to be processed and a plurality of data such as production schedule or processing data are stored as files for execution of automatic programming;

a user memory management table in which data concerning storage space, attribute, or capacity of each file is stored;

a write means for writing a new file from a peripheral device;

a capacity changing means for changing a capacity of each of the files;

a program execution management table for management of program execution;

a pointer table for storing pointers;

a pointer management table for storage of the address in the pointer table and for management of at least common pointers; and a control means responsive to said pointer table and pointer management table for selectively executing common pointers commonly available for all sequence programs or local pointers effective only for an individual sequence program.

10. A programmable controller comprising:

a user memory in which a plurality of sequence programs for each process or each item to be processed and a plurality of data such as production schedule or processing data are stored as files for execution of automatic programming;

a user memory management table in which data concerning storage space, attribute, or capacity of each file is stored;

a write means for writing a new file from a peripheral device;

capacity changing means for changing a capacity of each of the files;

a program execution management table for management of program execution;

a file data management table for management of file data; and a control means responsive to said program execution management table, said file data management table and said user memory management table for switching data files simultaneously when a first sequence program is switched to a second sequence program.

11. A programmable controller comprising:

a user memory in which a plurality of sequence programs for each process or each item to be processed and a plurality of data such as production schedule or processing data are stored as files for execution of automatic programming;

a user memory management table in which data concerning storage space, attribute, or capacity of each file is stored, write means for writing a new file from a peripheral device;

a capacity changing means for changing a capacity of each of the files;

a program execution management table for management of program execution;

a comment management table for management of comments; and a control means responsive to said program execution management table, said comment management table for switching a comment file simultaneously when a first sequence program is switched to a second sequence program.

* * * * *